(12) United States Patent
Kosuge et al.

(10) Patent No.: US 11,008,919 B2
(45) Date of Patent: May 18, 2021

(54) INTERNAL COMBUSTION ENGINE WITH TURBOCHARGER

(71) Applicants: TOYOTA JIDOSHA KABUSHIKI KAISHA, Toyota (JP); SOKEN, INC., Nishio (JP)

(72) Inventors: Hideaki Kosuge, Seto (JP); Tadayoshi Nakase, Aichi-ken (JP); Mitsunobu Uchida, Okazaki (JP); Masaaki Kono, Okazaki (JP); Keiji Yoeda, Numazu (JP)

(73) Assignees: TOYOTA JIDOSHA KABUSHIKI KAISHA, Toyota (JP); SOKEN, INC., Nishio (JP)

( * ) Notice: Subject to any disclaimer, the term of this patent is extended or adjusted under 35 U.S.C. 154(b) by 254 days.

(21) Appl. No.: 15/912,645

(22) Filed: Mar. 6, 2018

(65) Prior Publication Data
US 2018/0258817 A1   Sep. 13, 2018

(30) Foreign Application Priority Data

Mar. 7, 2017   (JP) .............................. JP2017-042949

(51) Int. Cl.
*F01N 3/20*   (2006.01)
*F01N 3/28*   (2006.01)
(Continued)

(52) U.S. Cl.
CPC ......... *F01N 3/2892* (2013.01); *F01N 3/2046* (2013.01); *F02B 37/183* (2013.01); *F02D 41/0007* (2013.01); *F02D 41/0235* (2013.01); *F02D 41/064* (2013.01); *F01N 2240/20* (2013.01); *F01N 2240/36* (2013.01); *F01N 2260/14* (2013.01); *F01N 2340/06* (2013.01);
(Continued)

(58) Field of Classification Search
CPC .. F01N 3/2892; F01N 3/2046; F01N 2340/06; F01N 2240/36; F01N 2240/20; F01N 2260/14; F01N 2390/00; F02B 37/183; F02D 41/0235; F02D 41/0007; F02D 41/064; F02D 2041/0265; Y02T 10/144
USPC ................................................ 60/602, 605.2
See application file for complete search history.

(56) References Cited

U.S. PATENT DOCUMENTS

2014/0165555 A1* 6/2014 Marques ................. F02B 37/18
60/602

FOREIGN PATENT DOCUMENTS

| JP | 55-101728 A | 8/1980 |
|---|---|---|
| JP | 4-128510 A | 4/1992 |

(Continued)

*Primary Examiner* — Audrey K Bradley
*Assistant Examiner* — Dapinder Singh
(74) *Attorney, Agent, or Firm* — Sughrue Mion, PLLC

(57) ABSTRACT

An internal combustion engine with a turbocharger includes a catalyst, downstream of a turbine, in an exhaust passage. The internal combustion engine includes a waste gate, and a waste gate valve. The internal combustion engine further includes a flow-adjusting member or a flow-adjusting mechanism. The flow-adjusting member disperses a flow of exhaust gas from the waste gate when the opening degree of the waste gate valve is small and concentrates the flow when the opening degree of the waste gate valve is large. The flow-adjusting mechanism switches between a dispersed state in which the flow is dispersed and a concentrate state in which the flow is concentrated.

2 Claims, 22 Drawing Sheets

(51) Int. Cl.
*F02B 37/18* (2006.01)
*F02D 41/00* (2006.01)
*F02D 41/06* (2006.01)
*F02D 41/02* (2006.01)

(52) U.S. Cl.
CPC .. *F01N 2390/00* (2013.01); *F02D 2041/0265* (2013.01); *Y02T 10/12* (2013.01)

(56) References Cited

FOREIGN PATENT DOCUMENTS

| | | |
|---|---|---|
| JP | 04-370327 A | 12/1992 |
| JP | 2003-254051 A | 9/2003 |
| JP | 2010-180781 A | 8/2010 |

\* cited by examiner

FIRST IDLING
AT TIME OF COLD START

111

AT TIME OF HIGH LOAD

111

HIGH

CATALYST
TEMPERATURE

LOW

FIRST IDLING
AT TIME OF COLD START

111

AT TIME OF HIGH LOAD

111

HIGH

CATALYST
TEMPERATURE

LOW

[WHEN FULLY OPENED]　　　[WHEN FULLY CLOSED]　　　[WHEN HALF OPENED]

FIG. 23A
FIG. 23B
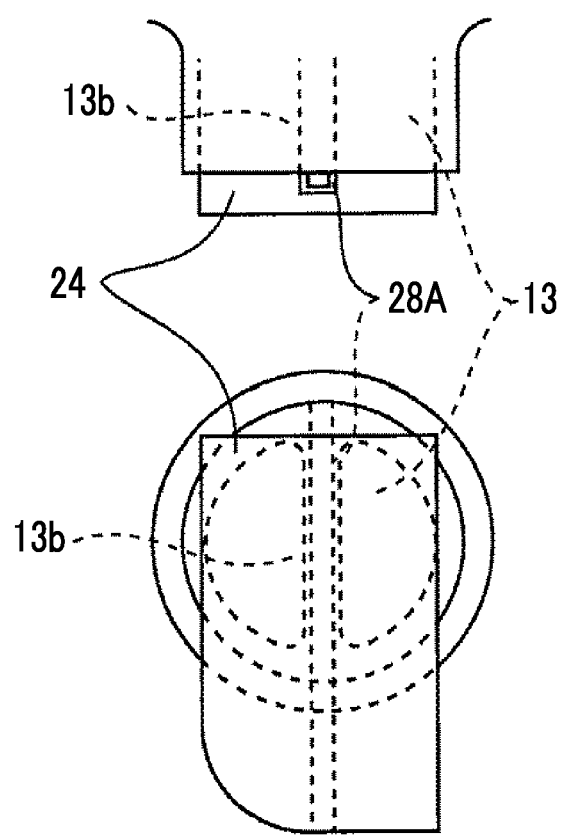
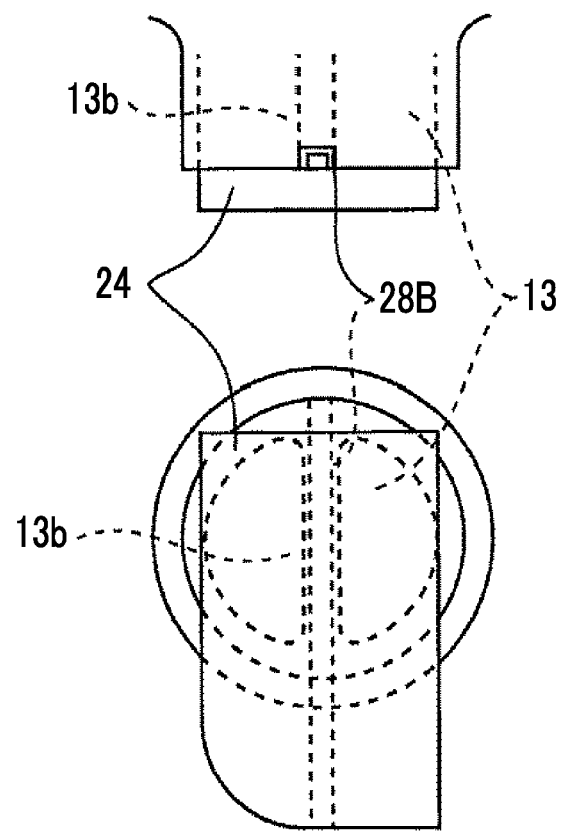

INTERNAL COMBUSTION ENGINE WITH TURBOCHARGER

INCORPORATION BY REFERENCE

The disclosure of Japanese Patent Application No. 2017-042949 filed on Mar. 7, 2017 including the specification, drawings and abstract is incorporated herein by reference in its entirety.

BACKGROUND

1. Technical Field

The present disclosure relates to an internal combustion engine with a turbocharger, and particularly to an internal combustion engine with a turbocharger including a waste gate valve.

2. Description of Related Art

Japanese Unexamined Patent Application Publication No. 4-370327 (JP 4-370327 A) discloses that, in an internal combustion engine including a bypass passage that bypasses a turbine of a turbocharger, and a bypass valve that opens and closes the bypass passage, the bypass valve is fully opened to supply exhaust gas from the bypass passage directly to a catalyst at the time of a cold start when the catalyst is not activated. Since an outlet of the bypass passage is provided immediately in front of the catalyst, exhaust gas is blown against the catalyst while maintaining high temperature.

The bypass valve is controlled depending on the load of the internal combustion engine. At the time of a high load, the bypass valve is opened merely slightly such that turbocharging pressure does not become excessive. In this case, the exhaust gas that has passed through the bypass valve becomes a flow that is adjusted and collected by the bypass passage, and flows into a portion of the catalyst. When a high-temperature exhaust gas is concentrated in one location, the catalyst locally has a high temperature. As a result, deterioration of the catalyst or damage thereof caused by thermal distortion occurs.

SUMMARY

The present disclosure provides an internal combustion engine with a turbocharger that can prevent deterioration or damage of a catalyst caused by a local excessive temperature rise at the time of a high load while realizing early warming-up of the catalyst at the time of a cold start.

A first aspect of the disclosure relates to an internal combustion engine with a turbocharger including a catalyst, downstream of a turbine of the turbocharger, in an exhaust passage. The internal combustion engine includes a waste gate, a waste gate valve, and a flow-adjusting member. The waste gate bypasses a turbine wheel of the turbine. The waste gate valve is provided at an outlet of the waste gate to open and close the waste gate. The waste gate valve is configured to change an opening degree in multiple steps. The flow-adjusting member disperses a flow of exhaust gas from the waste gate when the opening degree of the waste gate valve is small and concentrates the flow of the exhaust gas from the waste gate when the opening degree of the waste gate valve is large.

A second aspect of the disclosure relates to an internal combustion engine with a turbocharger including a catalyst, downstream of a turbine of the turbocharger, in an exhaust passage. The internal combustion engine includes a waste gate, a waste gate valve, and a flow-adjusting mechanism. the waste gate bypasses a turbine wheel of the turbine. The waste gate valve is provided at an outlet of the waste gate to open and close the waste gate. The flow-adjusting mechanism is configured to switch between a dispersed state and a concentrated state. The dispersed state is a state in which a flow of exhaust gas from the waste gate when the waste gate valve is opened is dispersed. The concentrated state is a state in which the flow of the exhaust gas from the waste gate when the waste gate valve is opened is concentrated.

With the internal combustion engine with a turbocharger according to the first aspect of the present disclosure, at the time of the cold start when the opening degree of the waste gate valve is increased, the early warming-up of the catalyst can be realized by concentrating the flow of the exhaust gas from the waste gate. At the time of the high load when the opening degree of the waste gate valve is reduced, deterioration or damage of the catalyst caused by a local excessive temperature rise can be prevented by dispersing the flow of the exhaust gas from the waste gate.

With the internal combustion engine with a turbocharger according to the second aspect of the present disclosure, by setting the form of the flow-adjusting mechanism at the time of the cold start to the concentrated state, the flow of the exhaust gas from the waste gate can be concentrated to realize the early warming-up of the catalyst. By setting the form of the flow-adjusting mechanism at the time of the high load to the dispersed state, the flow of the exhaust gas from the waste gate can be dispersed to prevent deterioration or damage of the catalyst caused by the local excessive temperature rise.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 23A is a front view and a plan view illustrating another modification example of the waste gate valve of Embodiment 2 of the present disclosure;

FIG. 23B is a front view and a plan view illustrating still another modification example of the waste gate valve of Embodiment 2 of the present disclosure;

DETAILED DESCRIPTION OF EMBODIMENTS

Embodiment 1

Figure 1:
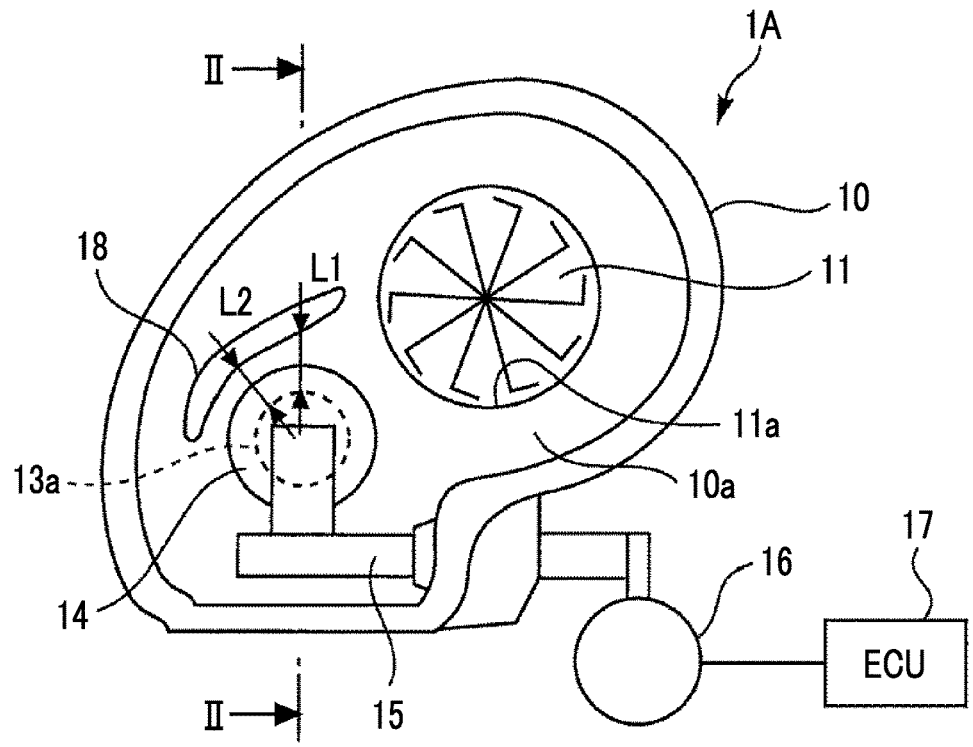
FIG. 1 is a view of a turbine of Embodiment 1 of the present disclosure as viewed from a discharge port side.
Figure 2:
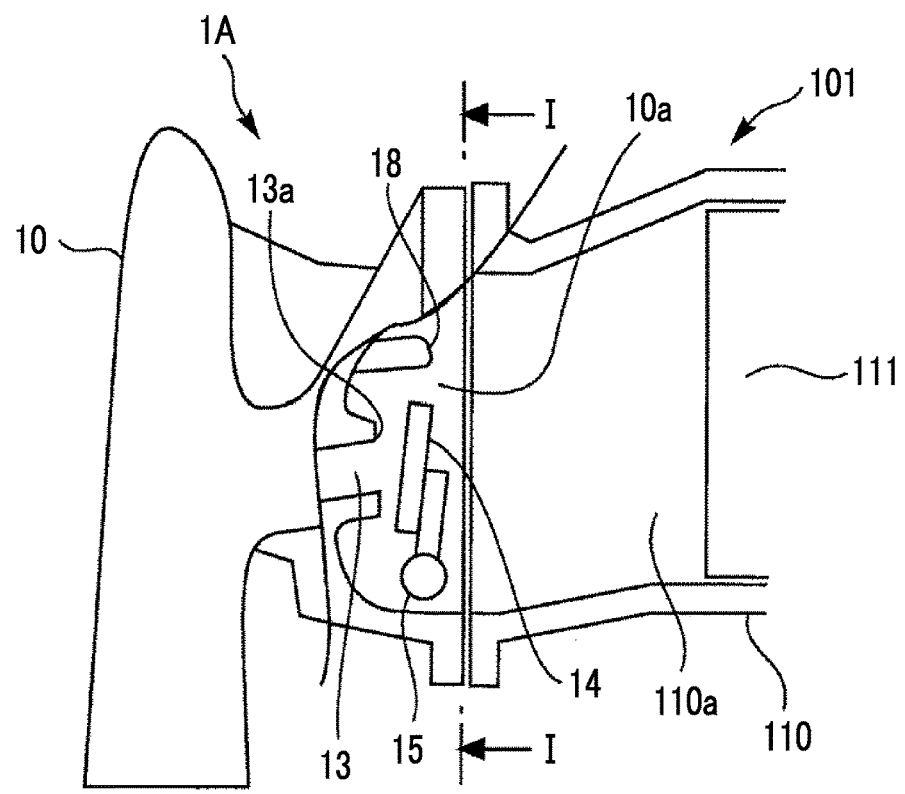
FIG. 2 is a longitudinal sectional view of an exhaust passage from a turbine discharge port to a catalyst inlet taken along line II-II of FIG. 1.

An internal combustion engine with a turbocharger in which the present disclosure is applied is an internal combustion engine with a turbocharger including a catalyst, downstream of a turbine, in an exhaust passage. There is no limitation on the type of internal combustion engine, and there is also no limitation on the number or arrangement of turbochargers. FIG. 1 is a view of a turbine 1A in an internal combustion engine with a turbocharger of Embodiment 1 as viewed from a discharge port side. FIG. 2 is a longitudinal sectional view of an exhaust passage from a turbine discharge port to a catalyst inlet taken along line II-II of FIG.

1. FIG. 1 is also a front view taken along line I-I of FIG. 2. Hereinafter, the structure of Embodiment 1 will be described with reference to the above-described drawings.

The turbine 1A has a turbine housing 10, and a turbine wheel 11 housed in the turbine housing 10. A catalyst converter 101 is provided directly downstream of the turbine 1A in an exhaust gas flow direction. The catalyst converter 101 has a catalyst housing 110, and a catalyst 111 housed in the catalyst housing 110. The turbine housing 10 is coupled to the catalyst housing 110, and an outlet part 10a of the turbine housing 10 communicates with an inlet part 110a of the catalyst housing 110.

A scroll (not illustrated) used as a part for introducing exhaust gas to the turbine wheel 11, and a waste gate 13 that bypasses the turbine wheel 11, are formed in the turbine housing 10. The waste gate 13 connects the scroll (not illustrated) and the outlet part 10a of the turbine housing 10 together. The outlet part 10a of the turbine housing 10 is provided with a turbine discharge port 11a to which the exhaust gas that has passed through the turbine wheel 11 is discharged. An outlet 13a (hereinafter, a waste gate outlet) of the waste gate 13 is provided in parallel with the turbine discharge port 11a on a wall surface in which the turbine discharge port 11a is open. The waste gate outlet 13a is provided such that a central part of an upstream end surface of the catalyst 111 is located on an extension line of a centerline of the waste gate 13.

The outlet part 10a of the turbine housing 10 is provided with a waste gate valve 14 that opens and closes the waste gate 13. The waste gate valve 14 is a flap-type valve that has a rotary shaft 15 disposed so as to intersect an arrangement direction of the turbine discharge port 11a and the waste gate outlet 13a at an acute angle and that opens and closes the waste gate 13 by rotating about the rotary shaft 15. The rotary shaft 15 is rotated by an actuator 16 via a link mechanism, and is made to open toward the downstream of the waste gate valve 14 in the exhaust gas flow direction. The actuator 16 can rotate the rotary shaft 15 at an arbitrary angle, and the waste gate valve 14 can take arbitrary opening degrees from a fully opened state to a fully closed state. The operation of the actuator 16 is controlled by an ECU 17.

A flow-adjusting plate 18 serving as a flow-adjusting member is provided on the surface of the turbine housing 10, on which the waste gate outlet 13a is formed, so as to protrude toward the outlet part 10a. The flow-adjusting plate 18 is provided in a wall shape along the waste gate outlet 13a at a position on the opposite side of the waste gate outlet 13a from the rotary shaft 15. The flow-adjusting plate 18 has a longer distance from the waste gate outlet 13a on a side near the turbine discharge port 11a, has a shorter distance from the waste gate outlet 13a on a side far from the turbine discharge port 11a. As a specific example, a distance L1 illustrated in FIG. 1 is longer than a distance L2. The height of the flow-adjusting plate 18 is greater than the amount of lift when the waste gate valve 14 is opened at a predetermined small lift angle (for example, about 10 degrees).

The operation and effects of Embodiment 1 will be described.

Figure 3:
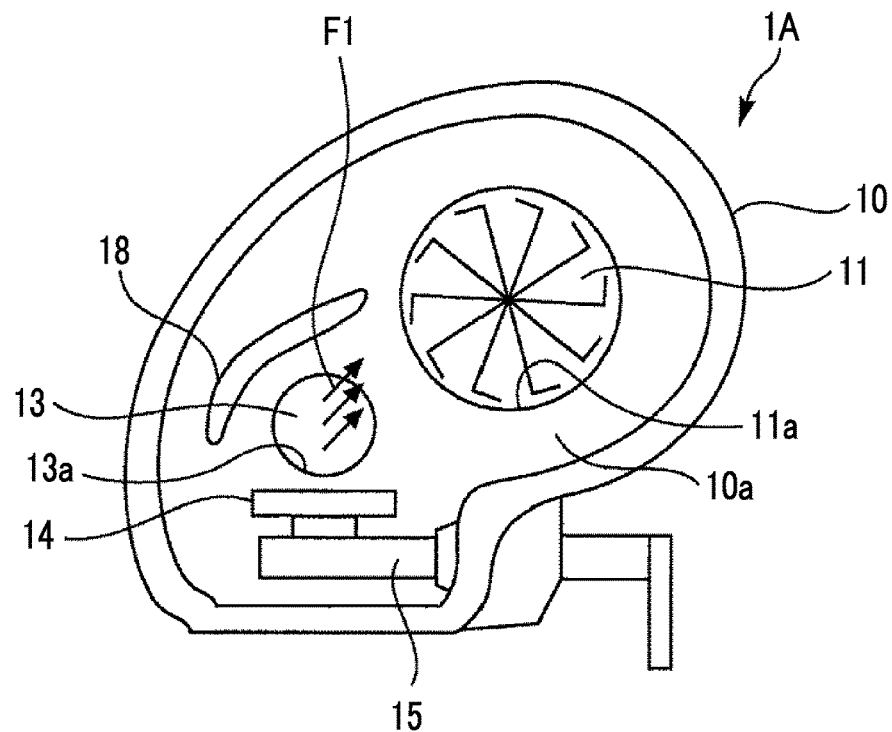
FIG. 3 is a view of an exhaust flow of a waste gate at the time of a large lift according to Embodiment 1 of the present disclosure as viewed from the turbine discharge port side.
Figure 4:
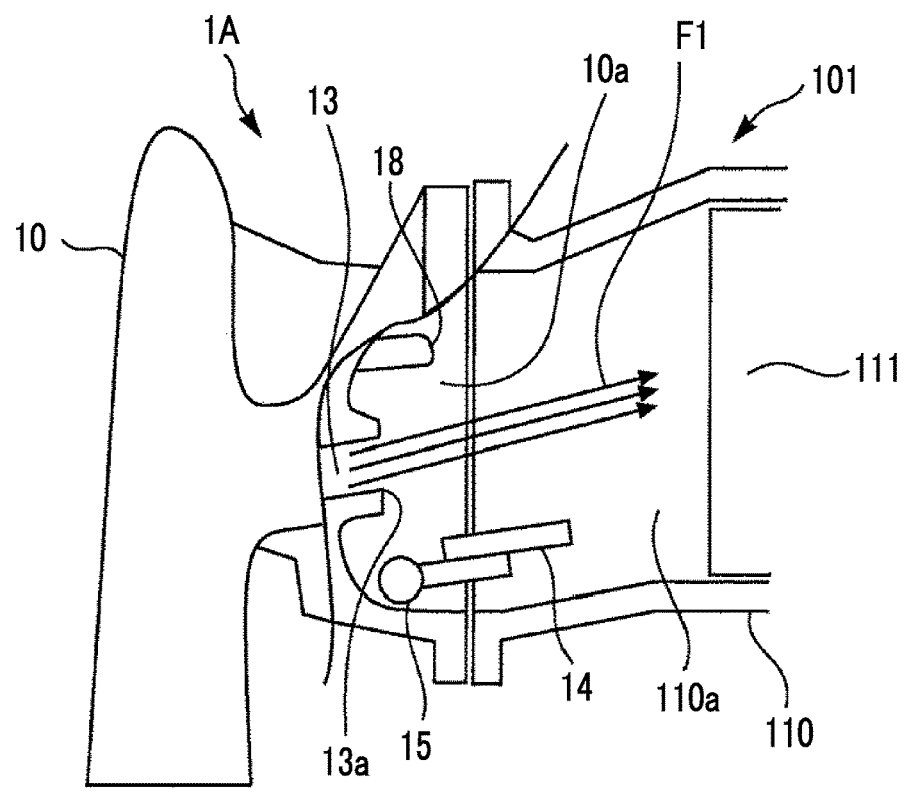
FIG. 4 is a view of the exhaust flow of the waste gate at the time of the large lift according to Embodiment 1 of the present disclosure as viewed in a longitudinal section of the exhaust passage.

FIG. 3 is a view of a flow (hereinafter, an exhaust flow of the waste gate) F1 of the exhaust gas from the waste gate 13 when the waste gate valve 14 has a large lift, for example, is fully opened, as viewed from a discharge port side of the turbine 1A. FIG. 4 is a view of the exhaust flow F1 of the waste gate when the waste gate valve 14 is fully opened, as viewed in a longitudinal section of the exhaust passage. When the waste gate valve 14 is fully opened, a high-temperature exhaust gas concentrates on the extension line of the waste gate 13. The catalyst 111 is present on the extension line of the waste gate 13, and exhaust gas intensively collides against substantially the center of the upstream end surface of the catalyst 111.

Figure 5:
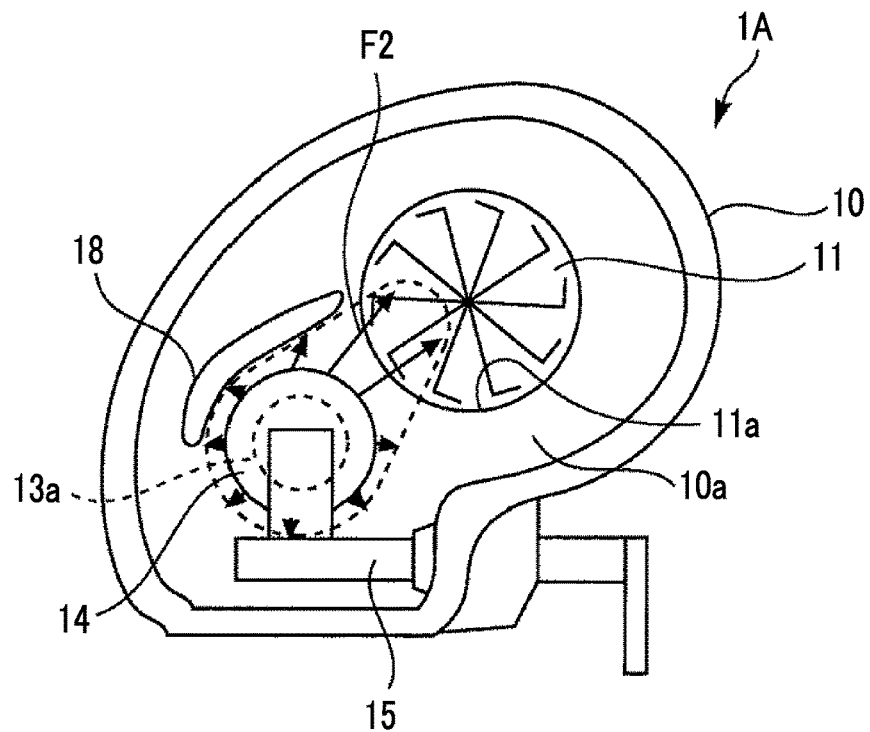
FIG. 5 is a view of an exhaust flow of the waste gate at the time of a small lift according to Embodiment 1 of the present disclosure as viewed from the turbine discharge port side.
Figure 6:
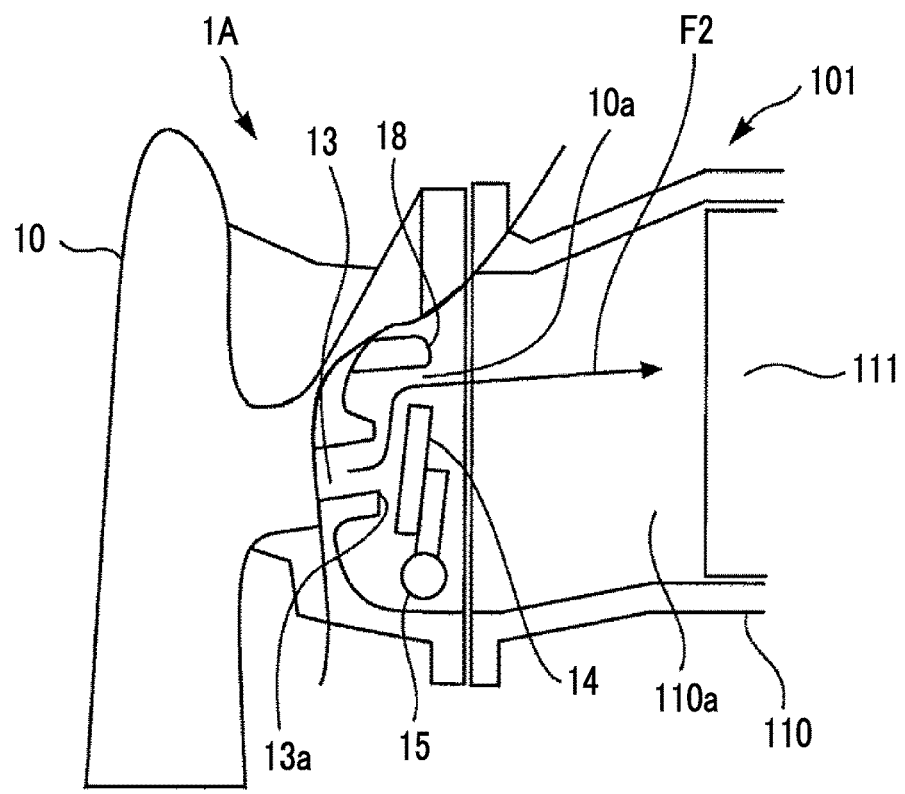
FIG. 6 is a view of the exhaust flow of the waste gate at the time of the small lift according to Embodiment 1 of the present disclosure as viewed in the longitudinal section of the exhaust passage.

FIG. 5 is a view of an exhaust flow F2 of the waste gate when the waste gate valve 14 has a small lift, for example, is opened at a predetermined small lift angle, as viewed from the discharge port side of the turbine 1A. FIG. 6 is a view of the exhaust flow F2 of the waste gate when the waste gate valve 14 is opened at a predetermined small lift angle, as viewed in the longitudinal section of the exhaust passage. When the waste gate valve 14 is opened at the time of a small lift angle, the exhaust flow F2 of the waste gate radially flows out of the center of the waste gate outlet 13a. However, the flow-adjusting plate 18 is provided on the opposite side of the waste gate outlet 13a from the rotary shaft 15. Since the distance between the flow-adjusting plate 18 and the waste gate outlet 13a is increased as the turbine discharge port 11a is approached, the exhaust flow F2 of the waste gate is guided in a direction toward the catalyst 111 and a direction toward the turbine discharge port 11a by the flow-adjusting plate 18. The exhaust gas that has passed through the turbine wheel 11 flows from the turbine discharge port 11a. Since the flow (hereinafter, the exhaust flow of the turbine) of the exhaust gas from the turbine discharge port 11a has a large flow rate and swirls due to the rotation of the turbine wheel 11, the exhaust flow F2 of the waste gate guided toward the turbine discharge port 11a is absorbed by the exhaust flow of the turbine and dispersed.

As described above, according to the configuration of Embodiment 1, when the opening degree of the waste gate valve 14 is small, the exhaust flow of the waste gate can be dispersed by the action of the flow-adjusting plate 18. On the other hand, when the opening degree of the waste gate valve 14 is large, the exhaust flow of the waste gate can be concentrated. The effect of being able to control the exhaust flow of the waste gate as described above will be described based on comparison with an exhaust flow of a waste gate according to a related-art apparatus.

Figure 7:
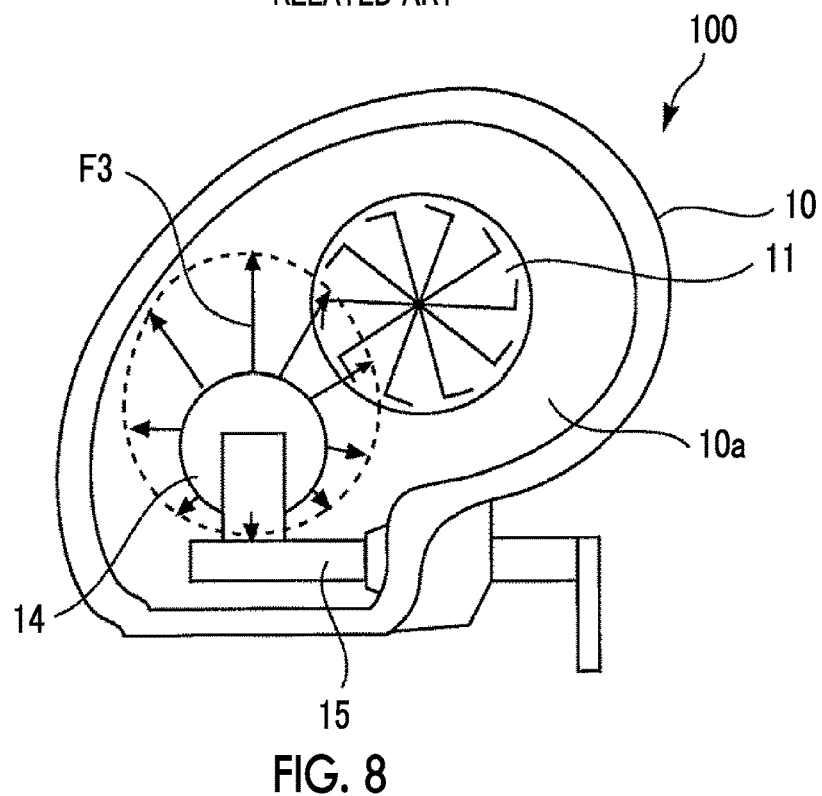
FIG. 7 is a view of an exhaust flow of a waste gate at the time of a small lift according to a related-art apparatus as viewed from a turbine discharge port side.
Figure 8:
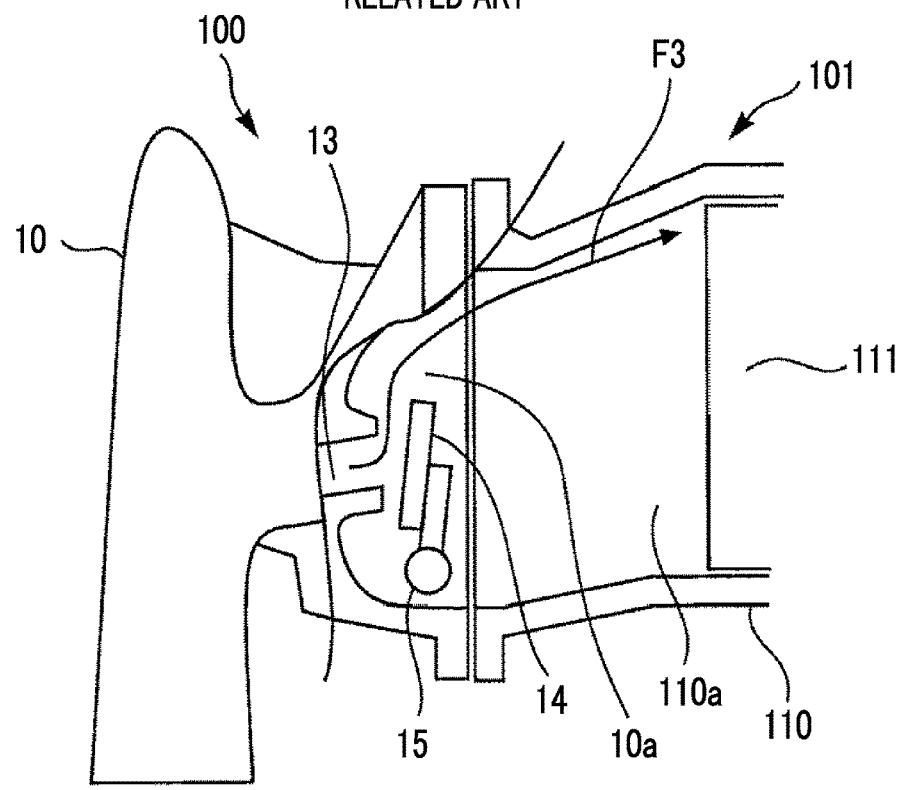
FIG. 8 is a view of the exhaust flow of the waste gate at the time of the small lift according to the related-art apparatus as viewed in a longitudinal section of an exhaust passage.

FIG. 7 is a view of an exhaust flow F3 of the waste gate when the waste gate valve 14 according to the related-art apparatus is opened at a predetermined small lift angle, as viewed from a discharge port side of a turbine 100. FIG. 8 is a view of the exhaust flow F3 of the waste gate when the waste gate valve 14 according to the related-art apparatus is opened at the predetermined small lift angle, as viewed in the longitudinal section of the exhaust passage. In the related-art apparatus, when the waste gate valve 14 opens at the time of the small lift angle, the exhaust flow F3 of the waste gate flows out radially from the center of the waste gate outlet 13a and toward a side opposite to the rotary shaft 15. Since no flow-adjusting plate is provided, unlike the configuration of the embodiment, the exhaust flow F3 of the waste gate reaches an inner wall surface of the outlet part 10a of the turbine housing 10 on a side far from the rotary shaft 15. The exhaust flow F3 of the waste gate is guided to the inner wall surface of the outlet part 10a of the turbine housing 10, and flows into a portion of an outer peripheral part of the catalyst 111 along an inner wall surface of the inlet part 110a of the catalyst housing 110. That is, in the related-art apparatus, even in a case where the waste gate valve 14 has the small lift angle, the exhaust flow F3 of the waste gate intensively flows into a portion of the catalyst 111 without being dispersed.

The waste gate valve 14 is fully opened at the time of a cold start when the catalyst 111 is not activated. After the activation of the catalyst 111, the waste gate valve 14 is controlled depending on the load of the internal combustion engine. At the time of a high load, the waste gate valve 14 is opened at a predetermined small lift angle such that turbocharging pressure does not become excessive. There is no difference between Embodiment 1 and the related-art apparatus in terms of the exhaust flow of the waste gate when the waste gate valve 14 is fully opened. However, as can be seen by comparing FIG. 5 and FIG. 6 with FIG. 7 and FIG. 8, in the exhaust flow of the waste gate when the waste gate valve 14 is opened at the time of the small lift angle, a distinct difference occurs between Embodiment 1 and the related-art apparatus. Since the exhaust flow of the waste gate has a higher temperature than the exhaust flow of the turbine, the difference of the exhaust flow of the waste gate causes a difference in the temperature distribution of the catalyst 111 into which the exhaust flow of the waste gate flows.

Figure 9:
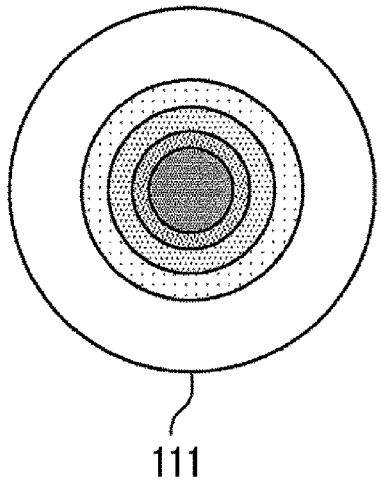
FIG. 9 is a view illustrating the temperature distribution of the catalyst at the time of a cold start and at the time of a high load according to Embodiment 1 of the present disclosure.
Figure 9:
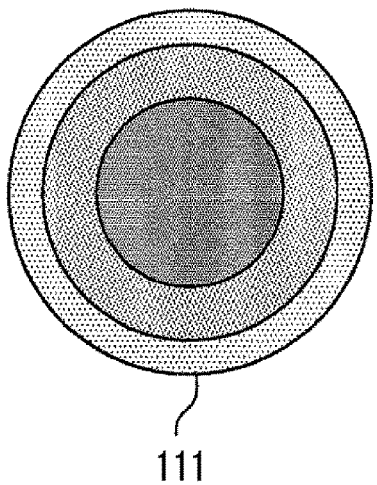
Figure 9:
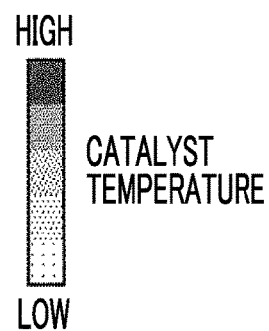
Figure 10:
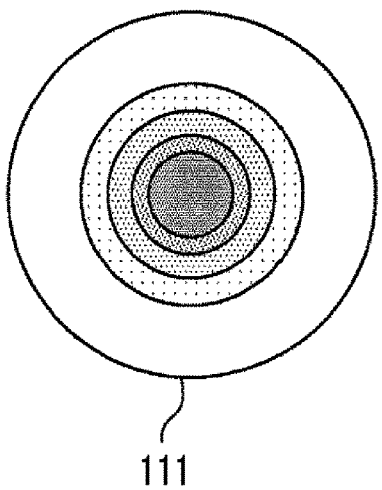
FIG. 10 is a view illustrating the temperature distribution of the catalyst at the time of the cold start and at the time of the high load according to the related-art apparatus.
Figure 10:
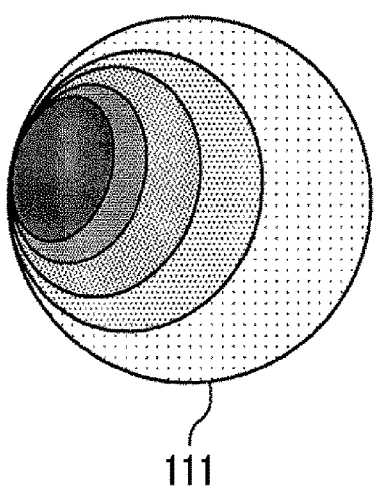
Figure 10:
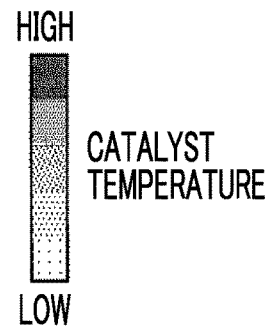

FIG. 9 is a view illustrating the temperature distribution of the catalyst 111 at the time of a cold start and at the time of a high load according to Embodiment 1. FIG. 10 is a view illustrating the temperature distribution of the catalyst 111 at the time of the cold start and at the time of the high load according to the related-art apparatus. The above-described temperature distribution is temperature distribution as viewed from the turbine housing 10 side. At the time of the cold start, by fully opening the waste gate valve 14, a high-temperature exhaust gas can be concentrated near the center of the catalyst 111 to locally perform early warming-up, and the catalyst 111 can be activated in a short time after the start to obtain purification performance. Since a high-temperature section can be located at the center of the catalyst 111, there is also an effect of preventing heat from escaping from the outer peripheral part of the catalyst 111. The above-described effect is an effect obtained not only in Embodiment 1 but also in the related-art apparatus.

On the other hand, in a case where the waste gate valve 14 is opened at the predetermined small lift angle at the time of the high load, in the related-art apparatus, the temperature of the catalyst 111 locally becomes high by the high-temperature exhaust gas flowing into a portion of the outer peripheral part of the catalyst 111. As a result, deterioration of the catalyst 111 or damage thereof caused by thermal distortion occurs. In contrast with the related-art apparatus, according to Embodiment 1, the bias of the temperature distribution of the catalyst 111 becomes small by the exhaust flow of the high-temperature waste gate being absorbed and diffused by the exhaust flow of the turbine. Thus, deterioration or damage of the catalyst 111 caused by a local excessive temperature rise can be prevented.

Figure 11:
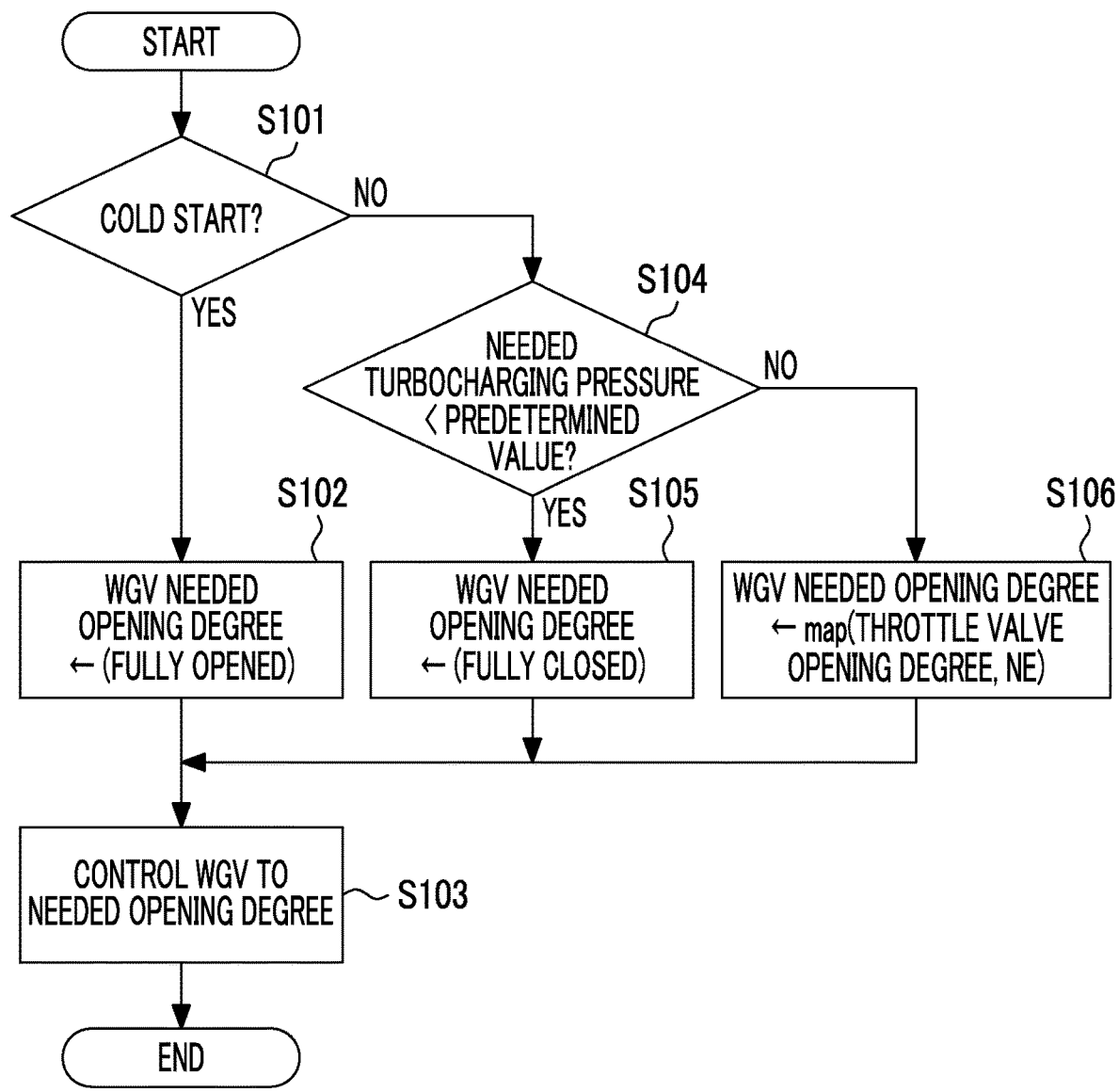
FIG. 11 is a flowchart illustrating a control flow of a waste gate valve of Embodiment 1 of the present disclosure.

The control of the opening degree of the waste gate valve 14 is performed by the ECU 17. The ECU 17 is a control device that controls the operation of the internal combustion engine, and includes at least one processor and at least one memory. By executing one of programs stored in a memory by a processor, a control flow of the waste gate valve illustrated by a flowchart in FIG. 11 is executed. The ECU 17 repeatedly executes the processing shown in the control flow in a certain cycle.

According to the control flow, first, whether or not the current time is a cold start time is determined in Step S101. Whether or not the current time is the cold start time is determined from, for example, the coolant temperature of the internal combustion engine. In a case where the current time is the cold start time, in Step S102, a fully opened opening degree is set as a needed opening degree (written as a "WGV needed opening degree" in the flowchart) of the waste gate valve 14.

In a case where the current time is not the cold start time, whether or not a currently needed turbocharging pressure is smaller than a predetermined value is determined in Step S104. The predetermined value referred to in Step S104 is an upper limit value of an allowable range of the turbocharging pressure at the time of the high load. In a case where the needed turbocharging pressure is smaller than the predetermined value that is the upper limit value, in Step S105, a fully closed opening degree is set as the needed opening degree of the waste gate valve 14. In a case where the needed turbocharging pressure is equal to or more than the predetermined value that is the upper limit value, in Step S106, an opening degree depending on a load is set as the needed opening degree of the waste gate valve 14. The opening degree depending on a load is acquired from a map in which a throttle valve opening degree and an engine speed (NE) are used as parameters.

When the needed opening degree of the waste gate valve 14 is set in Step S102, S105, or S106, the operation of the actuator 16 is controlled such that the opening degree of the waste gate valve 14 becomes the needed opening degree in Step S103. As described above, the waste gate valve 14 is fully opened at the time of the cold start, and the waste gate valve 14 is opened at a predetermined small lift opening degree at the time of the high load.

Embodiment 2

Figure 12:
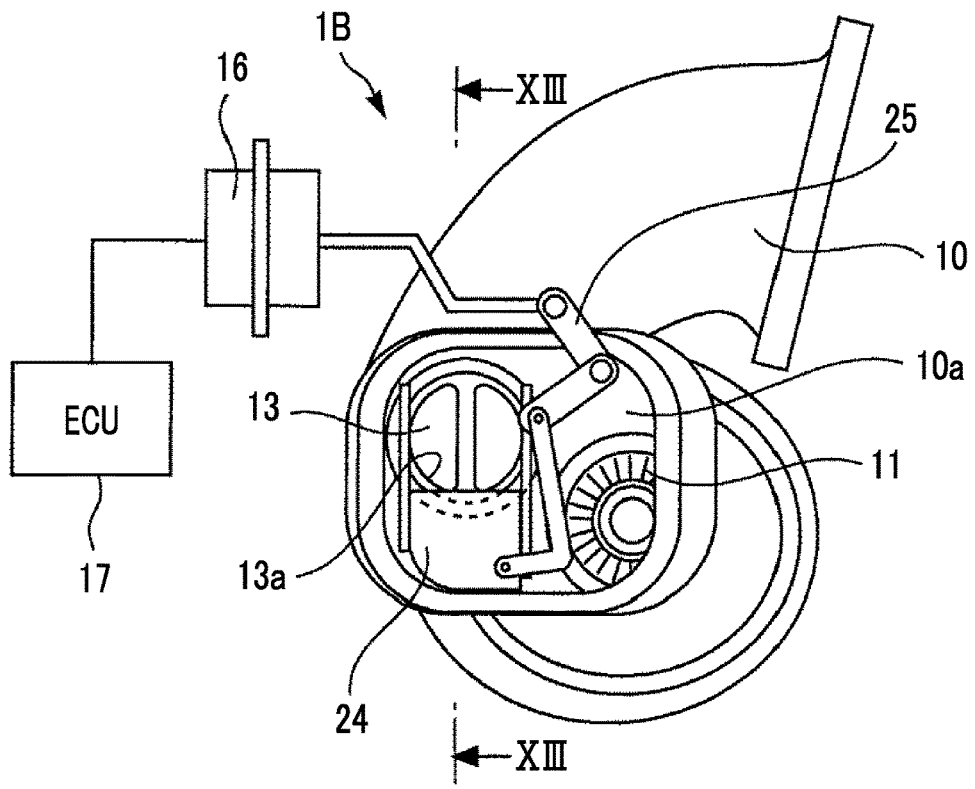
FIG. 12 is a view of a turbine of Embodiment 2 of the present disclosure as viewed from a discharge port side.
Figure 13:
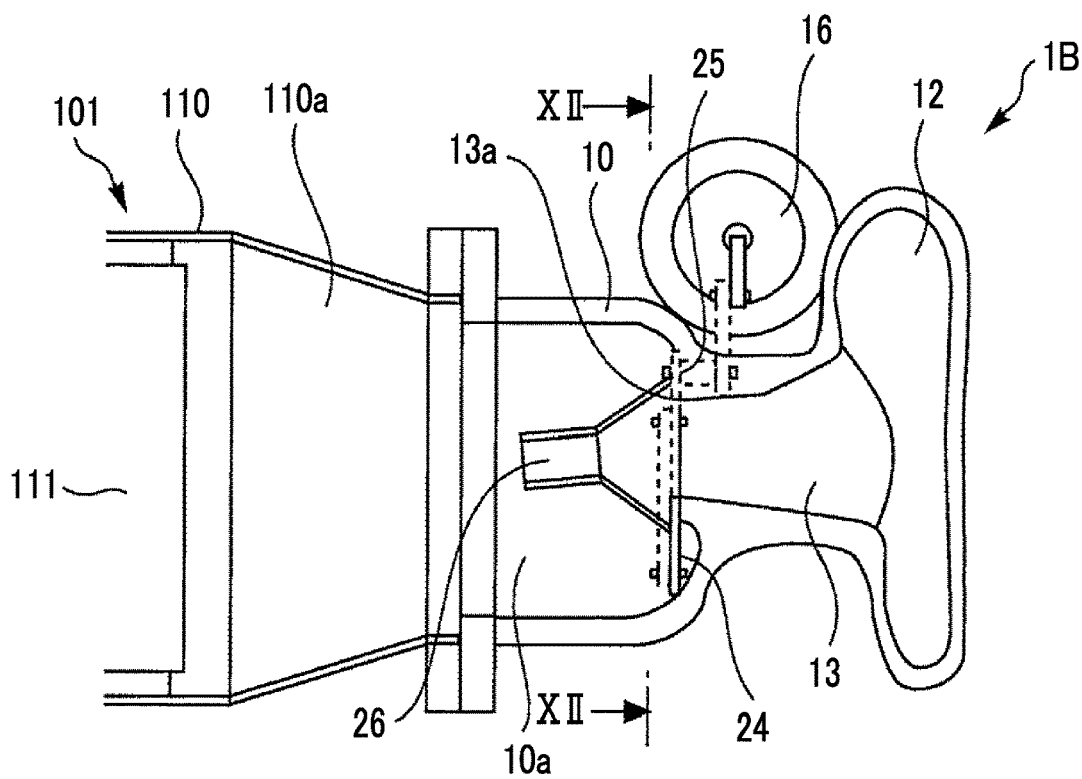
FIG. 13 is a longitudinal sectional view of the exhaust passage from the turbine discharge port to the catalyst inlet taken along line XIII-XIII of FIG. 12.

Embodiment 2 of the present disclosure will be described. FIG. 12 is a view of a turbine 1B in an internal combustion engine with a turbocharger of Embodiment 2 as viewed from the discharge port side. FIG. 13 is a longitudinal sectional view of the exhaust passage from the turbine discharge port to the catalyst inlet taken along line XIII-XIII of FIG. 12. FIG. 12 is also a front view taken along line XII-XII of FIG. 13. Hereinafter, the structure of Embodiment 2 will be described with reference to the above-described drawings. In the respective drawings, the elements that are common to those of Embodiment 1 will be designated by the same reference signs.

A waste gate valve 24 of Embodiment 2 is a slide-type valve that opens and closes the waste gate 13 by sliding in parallel with a surface where the outlet 13a of the waste gate 13 is provided. The waste gate valve 24 is connected to the actuator 16 by a link mechanism 25. As the link mechanism 25 is extended and retracted in accordance with the operation of the actuator 16, the waste gate valve 24 slidingly moves in one direction.

The flow-adjusting member of Embodiment 2 is a funnel-type duct 26 which is provided downstream of the outlet 13a of the waste gate 13 across the waste gate valve 24 and of which the flow passage cross-sectional area decreases from the upstream side to the downstream side. The diameter on the upstream side of the funnel-type duct 26 is greater than the diameter of the outlet 13a of the waste gate 13, and all the exhaust gas discharged from the waste gate 13 enters the duct 26.

The operation and effects of Embodiment 2 will be described.

Figure 14:
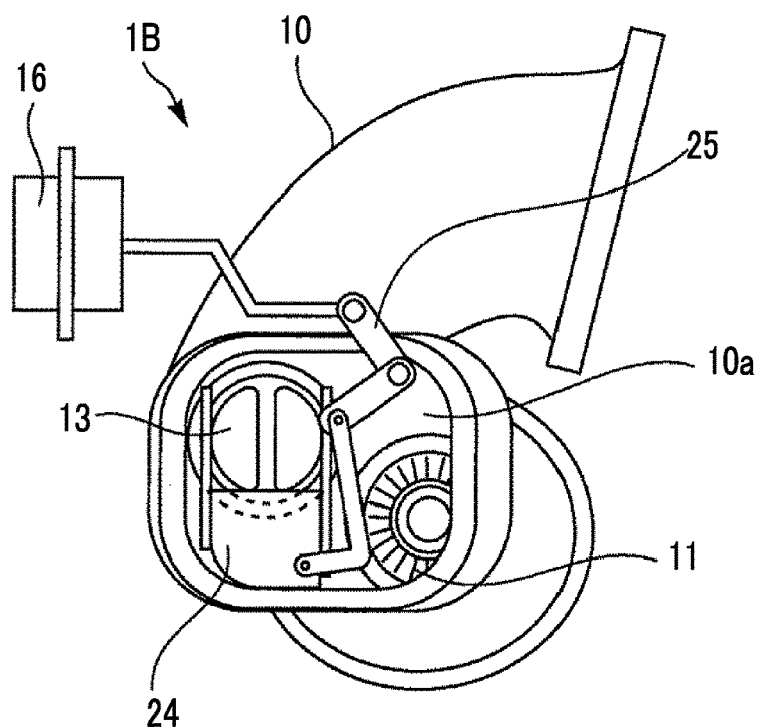
FIG. 14 is a view illustrating the position of the waste gate valve when fully opened, according to Embodiment 2 of the present disclosure.
Figure 15:
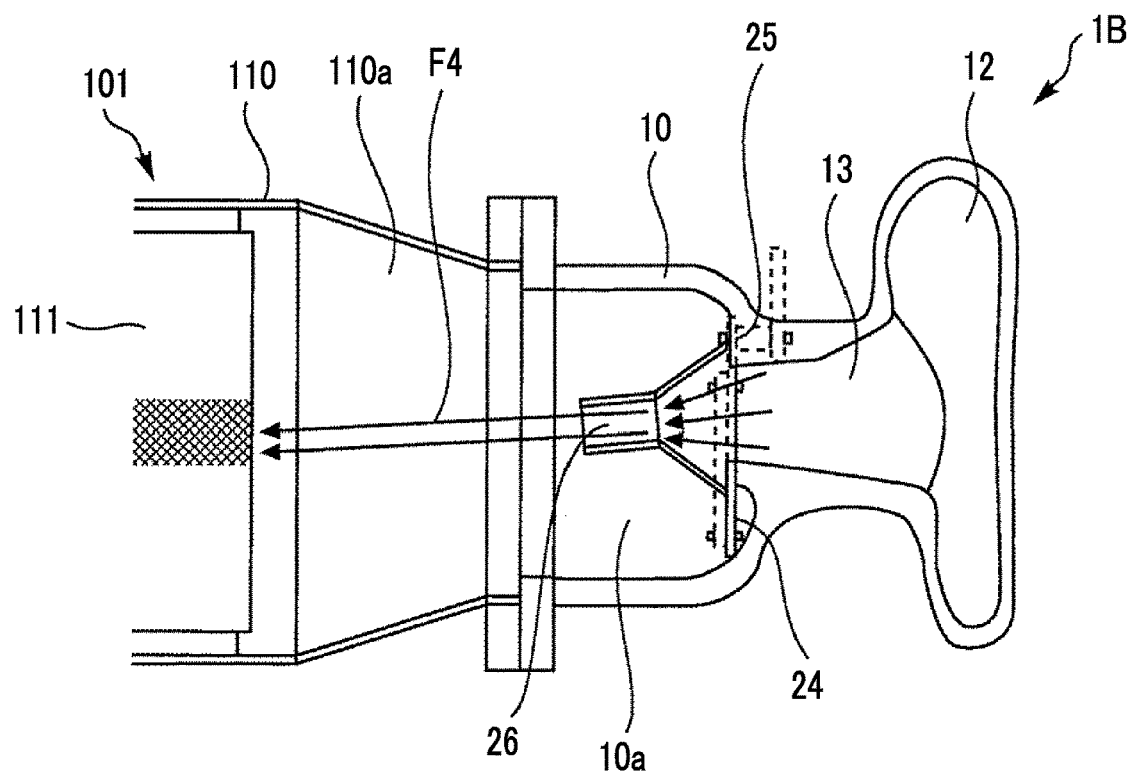
FIG. 15 is a view of the position of the waste gate valve and the exhaust flow of the waste gate when the waste gate valve is fully opened, according to Embodiment 2 of the present disclosure, as viewed in the longitudinal section of the exhaust passage.

FIG. 14 is a view illustrating the position of the waste gate valve 24 when fully opened. FIG. 15 is a view of the position of the waste gate valve 24 and an exhaust flow F4 of the waste gate when the waste gate valve is fully opened, as viewed in the longitudinal section of the exhaust passage. At the time of the cold start, the waste gate valve 24 is fully opened. By fully opening the waste gate valve 24, exhaust gas does not pass through the turbine wheel 11, passes through the waste gate 13 from a scroll 12, reaches the outlet part 10a of the turbine housing 10, and reaches the catalyst 111 while maintaining high temperature. In this case, as the exhaust gas passes through the funnel-type duct 26, the exhaust flow F4 of the waste gate is throttled and concentrated at an outlet of the funnel-type duct 26, and is directed to the center of the upstream end surface of the catalyst 111. As described above, the high-temperature exhaust gas can be concentrated near the center of the catalyst 111 to locally perform the early warming-up, and the catalyst 111 can be activated in a short time after the start to obtain the purification performance. By locating the high-temperature section at the center of the catalyst 111, there is also an effect of preventing heat from escaping from the outer peripheral part of the catalyst 111 to promote the early warming-up.

Figure 16:
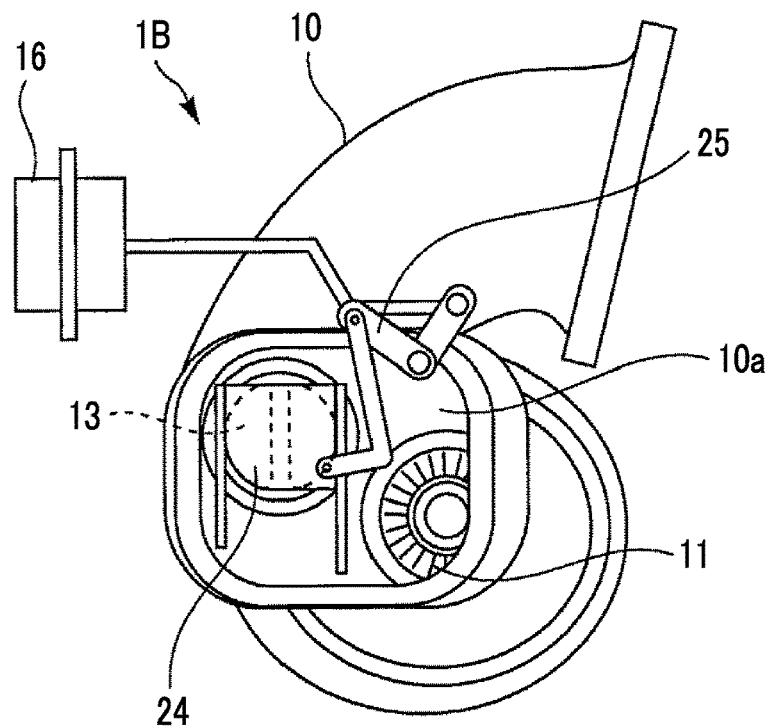
FIG. 16 is a view illustrating the position of the waste gate valve when fully closed, according to Embodiment 2 of the present disclosure.
Figure 17:
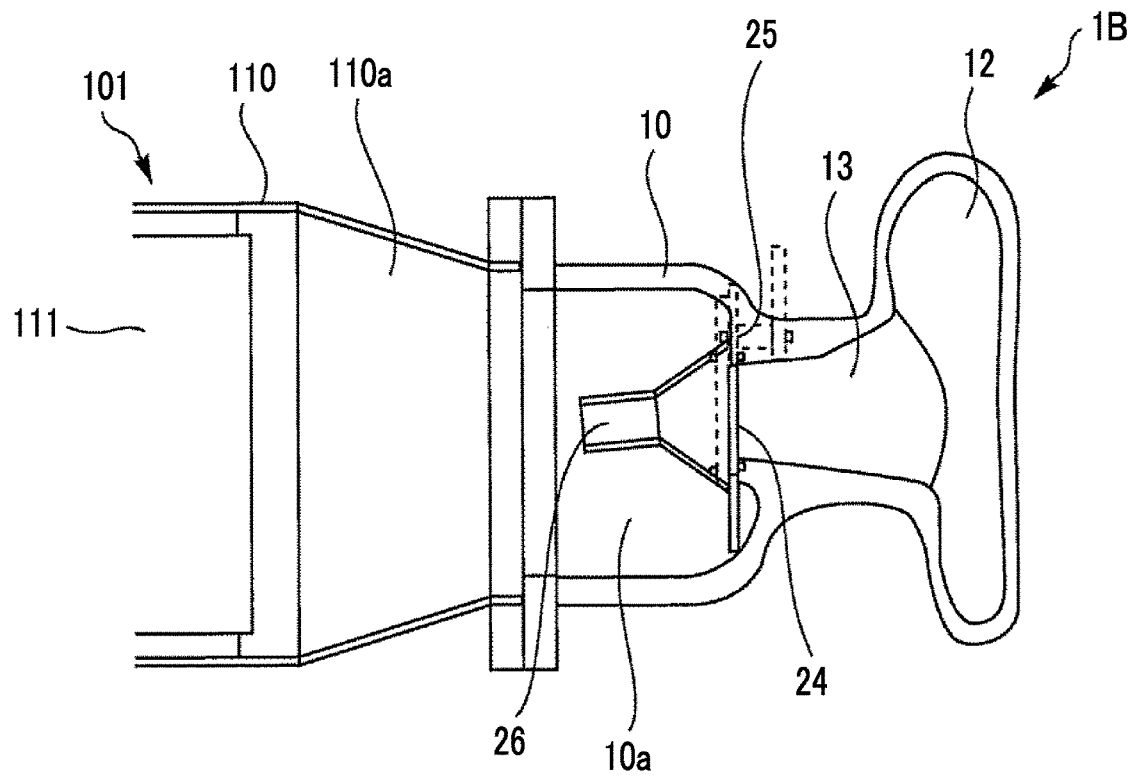
FIG. 17 is a view of the position of the waste gate valve and the exhaust flow of the waste gate when the waste gate valve is fully closed, according to Embodiment 2 of the present disclosure, as viewed in the longitudinal section of the exhaust passage.

FIG. 16 is a view illustrating the position of the waste gate valve 24 when fully closed. FIG. 16 is a view of the position of the waste gate valve 24 and the exhaust flow F4 of the waste gate when the waste gate valve is fully closed, as viewed in the longitudinal section of the exhaust passage. Except for the cold start time, in a case where the load is small and the turbocharging pressure falls within the allowable range, the waste gate valve 24 is fully closed. When the waste gate valve 24 is fully closed, exhaust gas does not pass through the waste gate 13, passes through the turbine wheel 11 from the scroll 12, and reaches the outlet part 10a of the turbine housing 10 (the exhaust flow of the turbine is not illustrated). The exhaust gas that has passed through the turbine wheel 11 is swirled and dispersed and uniformly passes through the catalyst 111.

Figure 18:
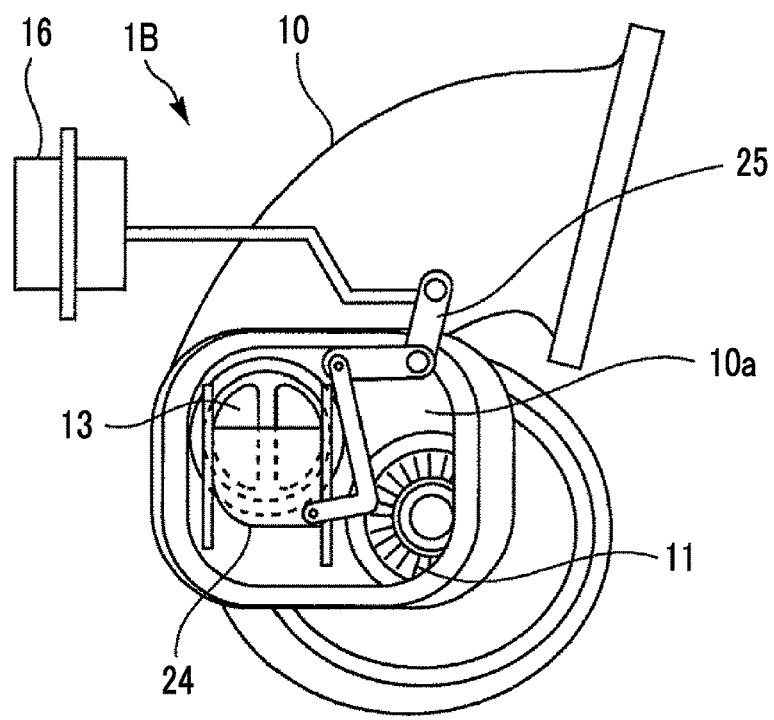
FIG. 18 is a view illustrating the position of the waste gate valve when half opened, according to Embodiment 2 of the present disclosure.
Figure 19:
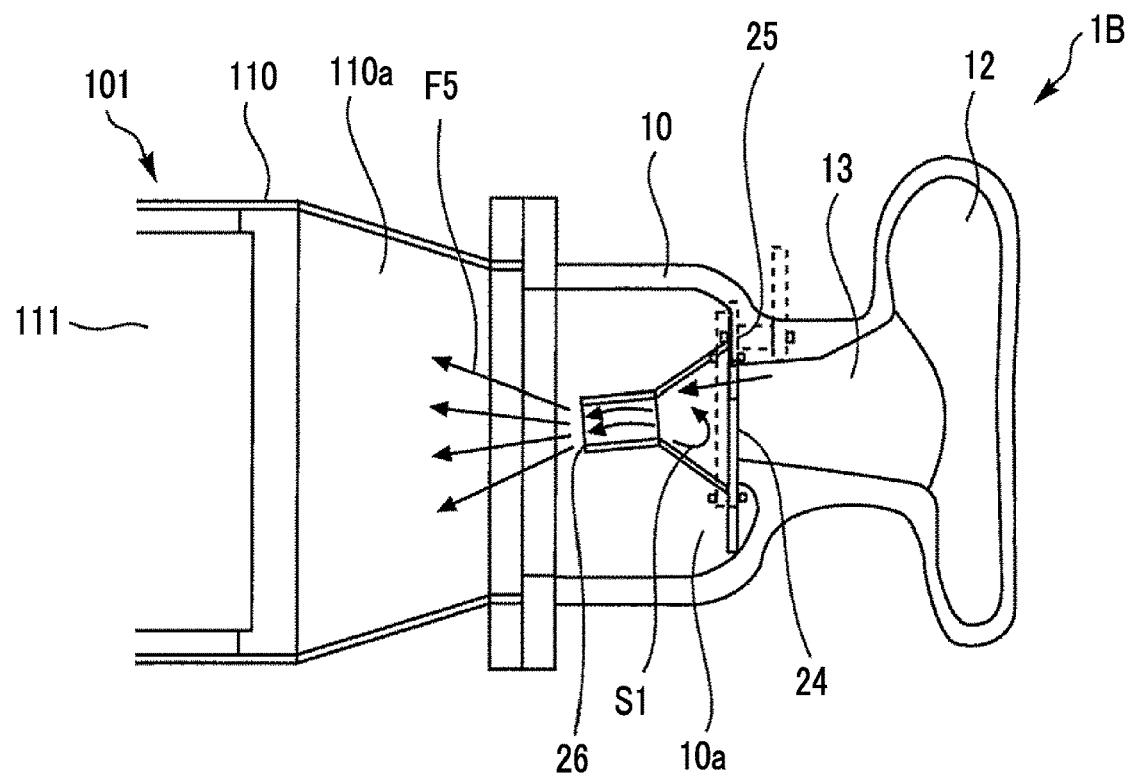
FIG. 19 is a view of the position of the waste gate valve and the exhaust flow of the waste gate when the waste gate valve is half opened, according to Embodiment 2 of the present disclosure, as viewed in the longitudinal section of the exhaust passage.

FIG. 18 is a view illustrating the position of the waste gate valve 24 when half opened. FIG. 19 is a view of the position of the waste gate valve 24 and the exhaust flow F5 of the waste gate when the waste gate valve is half opened, as viewed in the longitudinal section of the exhaust passage. Except for the cold start time, in a case where the load is large and the turbocharging pressure exceeds the allowable range, the waste gate valve 24 is half opened. The term "half opened" as used herein means an opening degree from fully opening and fully closing without meaning the exact half of an opening degree. By half-opening the waste gate valve 24, a vortex S1 is generated inside the funnel-type duct 26. Due to the action of the vortex S1, the straightness of the exhaust flow F5 of the waste gate decreases and is dispersed toward the inlet part 110a of the catalyst housing 110 from the outlet of the duct 26. As described above, the concentration of the high-temperature exhaust gas to the center of the catalyst 111 is suppressed, and the deterioration or damage of the catalyst 111 caused by the local excessive temperature rise can be prevented.

Figure 20:
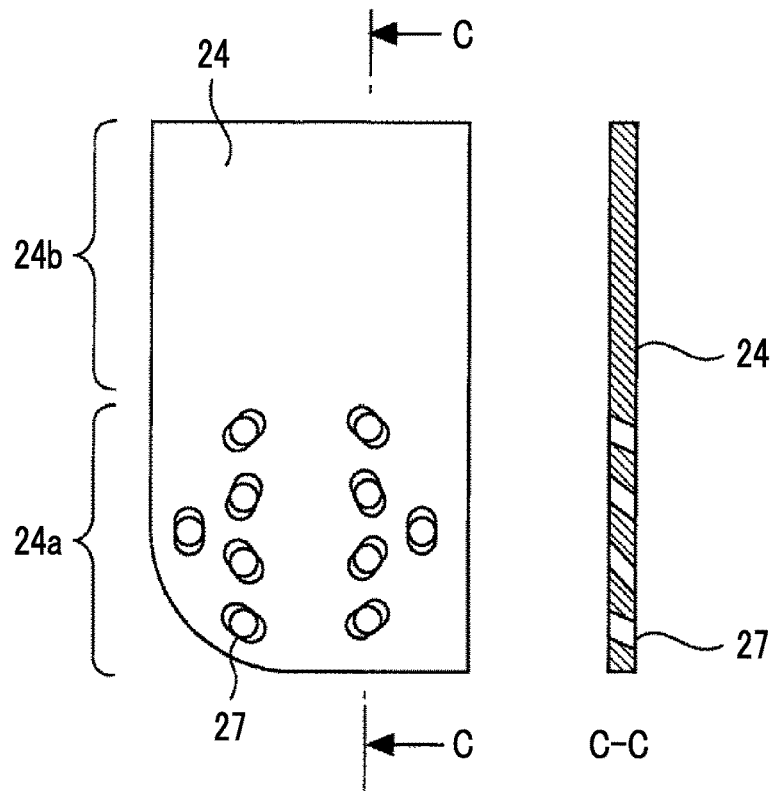
FIG. 20 is a front view and a sectional view illustrating a modification example of the waste gate valve of Embodiment 2 of the present disclosure.

A modification example of Embodiment 2 will be described. FIG. 20 is a front view and a sectional view illustrating the modification example of the waste gate valve 24 of Embodiment 2. In the modification example, the waste gate valve 24 has a first region 24a where a plurality of holes 27 is formed and a second region 24b where no hole is formed, side by side in a sliding direction. The holes 27 formed in the first region 24a are provided to incline from a line perpendicular to a surface brought into close contact with the waste gate 13.

Figure 21:
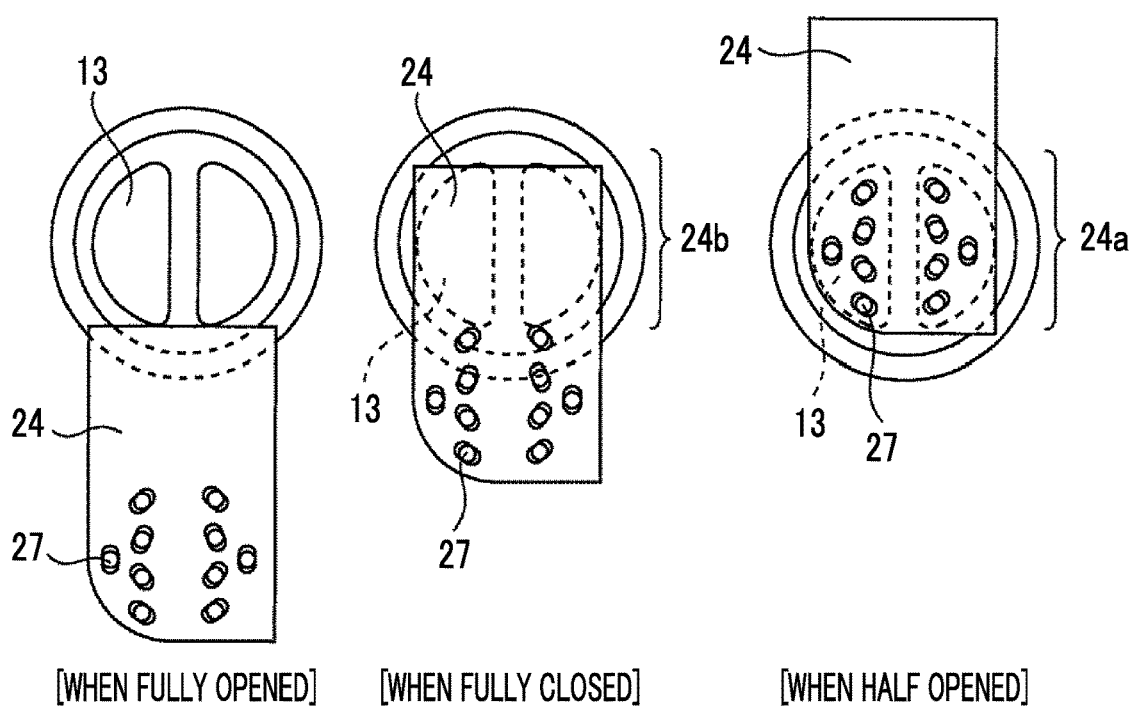
FIG. 21 is a view illustrating the positions of the waste gate valve when fully opened, fully closed, and half opened, using the modification example illustrated in FIG. 20.

FIG. 21 is a view illustrating the positions of the waste gate valve 24 when fully opened, fully closed, and half opened, using the modification example illustrated in FIG. 20. A position where neither the first region 24a nor the second region 24b hangs on the waste gate 13 is a position where the waste gate valve 24 is fully opened. A position where a lid of the waste gate 13 is placed in the second region 24b is a position where the waste gate valve 24 is fully closed. A position where a lid of the waste gate 13 is placed in the first region 24a is a position where the waste gate valve 24 is half opened.

Figure 22:
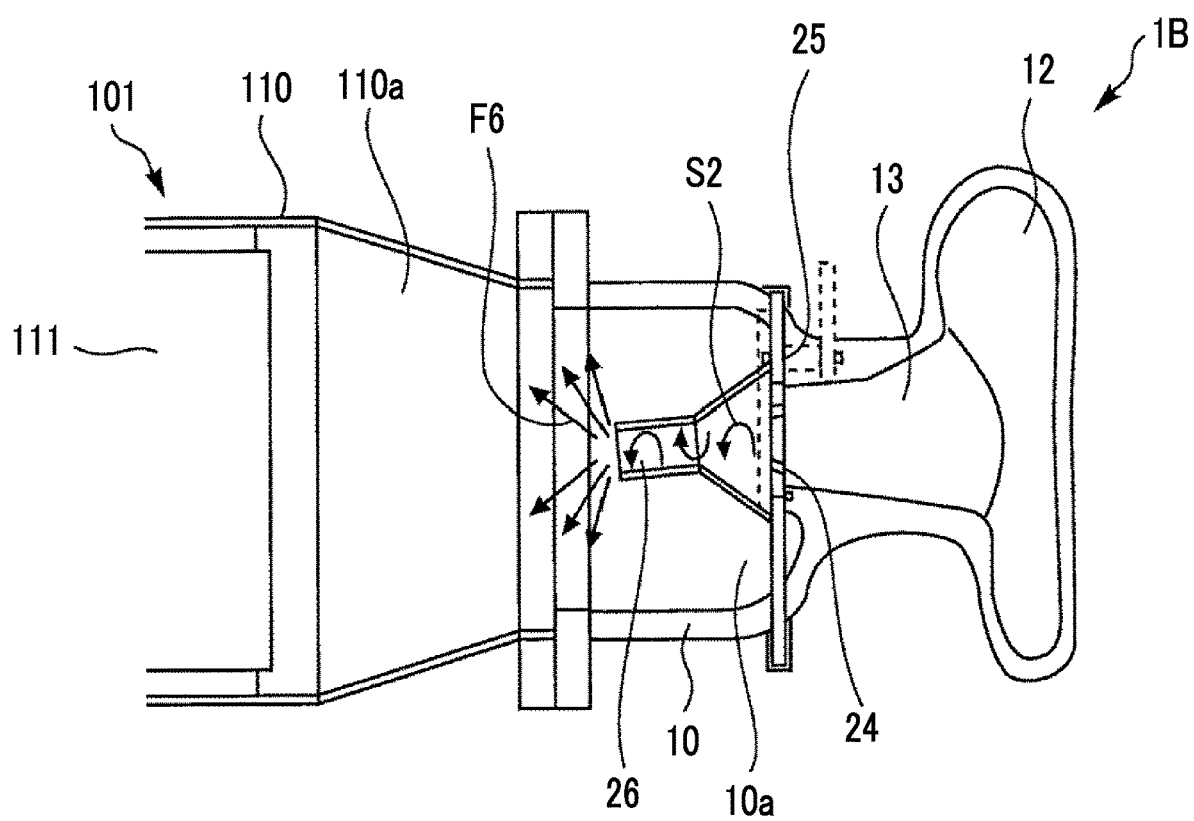
FIG. 22 is a view of the position of the waste gate valve and the exhaust flow of the waste gate when the waste gate valve is half opened, according to the modification example illustrated in FIG. 20, as viewed in the longitudinal section of the exhaust passage.

FIG. 22 is a view of the position of the waste gate valve 24 and an exhaust flow F6 of the waste gate when the waste gate valve is half opened, according to the modification example illustrated in FIG. 20, as viewed in the longitudinal section of the exhaust passage. At the half opened position, a vortex flow S2 is generated inside the funnel-type duct 26 as exhaust gas passes through the holes 27 that are obliquely formed in the waste gate valve 24. Due to a decrease in the straightness of the exhaust gas under the influence of the vortex flow S2, the exhaust flow F6 of the waste gate is dispersed when the exhaust gas comes out of the funnel-type duct 26.

FIGS. 23A and 23B are a front view and a plan view illustrating another modification example of the waste gate valve 24 of Embodiment 2 of the present disclosure. The waste gate 13 has a partition wall 13b that bisects the outlet and extends in the sliding direction of the waste gate valve 24. In the modification example, engagement parts 28A, 28B that are slidable in the sliding direction are provided between the partition wall 13b and a back surface of the waste gate valve 14. In the modification example of FIG. 23A, the engagement part 28A is constituted of a protrusion formed on the partition wall 13b and a recess formed in the back surface of the waste gate valve 14. In the modification example of FIG. 23B, the engagement part 28B is constituted of a recess formed in the partition wall 13b and a protrusion formed on the back surface of the waste gate valve 14. In the above-described case, the waste gate valve 14 slides along the partition wall 13b while the protrusion or recess in the back surface is fitted to the recess or protrusion on the partition wall 13b. As the recess and the protrusion are combined together, the demarcation of the outlet of the waste gate 13 becomes more reliable, and degradation of the turbo performance caused by exhaust interference can be suppressed.

Embodiment 3

Figure 24:
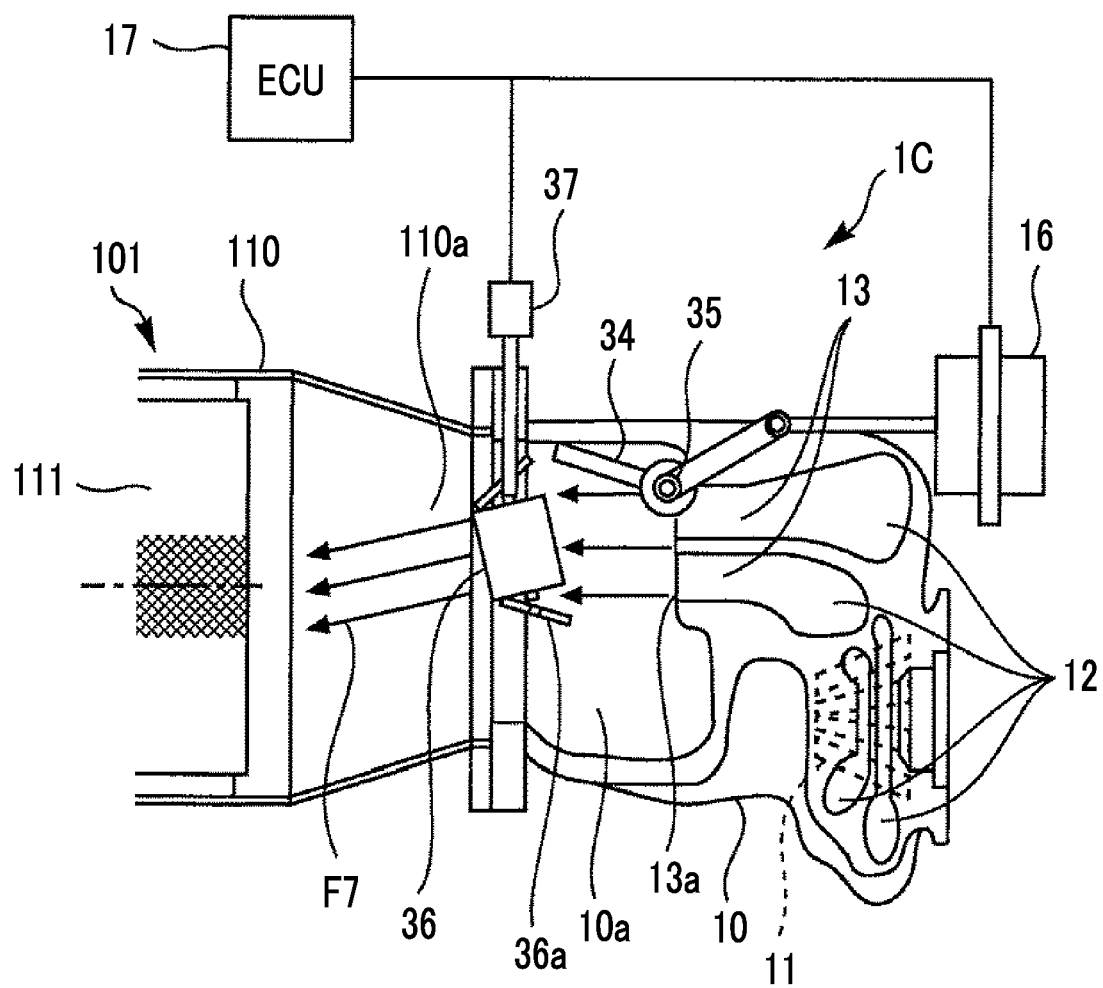
FIG. 24 is a longitudinal sectional view illustrating a configuration in a concentrated state of a flow-adjusting mechanism of Embodiment 3 of the present disclosure and an exhaust flow of a waste gate according to the concentrated state.
Figure 25:
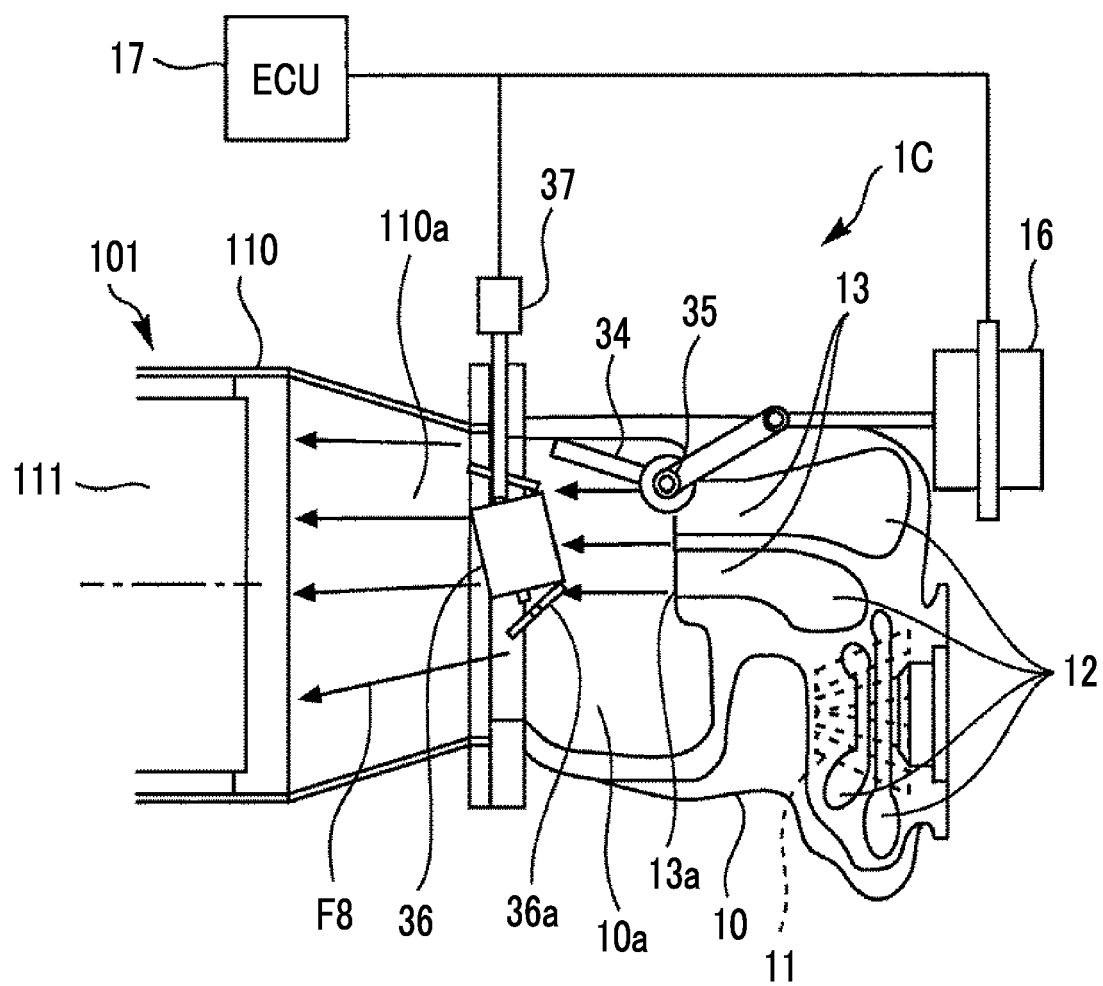
FIG. 25 is a longitudinal sectional view illustrating a configuration in a dispersed state of the flow-adjusting mechanism of Embodiment 3 of the present disclosure and an exhaust flow of the waste gate according to the dispersed state.

Embodiment 3 of the present disclosure will be described. FIG. 24 is a longitudinal sectional view illustrating a configuration in a concentrated state of a flow-adjusting mechanism in the internal combustion engine with a turbocharger of Embodiment 3 and an exhaust flow F7 of the waste gate according to the concentrated state. FIG. 25 is a longitudinal sectional view illustrating a configuration in a dispersed state of a flow-adjusting mechanism in the internal combustion engine with a turbocharger of Embodiment 3 and an exhaust flow F8 of the waste gate according to the dispersed state. Hereinafter, the structure of Embodiment 3 will be described with reference to the above-described drawings. In the respective drawings, the elements that are common to those of Embodiments 1 and 2 will be designated by the same reference signs.

Unlike Embodiments 1 and 2, a turbine 1C of Embodiment 3 includes a flow-adjusting mechanism of which the form is switchable, rather than a flow-adjusting member. The flow-adjusting mechanism of Embodiment 3 includes an airflow control tube 36 provided downstream of the outlet 13a of the waste gate 13, and an actuator 37 that operates the airflow control tube 36. The airflow control tube 36 is formed by combining four airflow control plates 36a in a tubular shape, and the actuator 37 changes the angle of each airflow control plate 36a of the airflow control tube 36. The operation of the actuator 37 is controlled by the ECU 17.

The outlet 13a of the waste gate 13 is provided with a flap-type waste gate valve 34 that rotates about a rotary shaft 35. The waste gate valve 34 is operated to be fully opened or fully closed via a link mechanism by the actuator 16. The airflow control tube 36 is disposed out of a rotational range of the waste gate valve 34 so as not to interfere with the waste gate valve 34.

By changing the angle of the airflow control plate 36a by the actuator 37, the form of the airflow control tube 36 is switched. The form of the airflow control tube 36 includes a dispersed state in which the flow of the exhaust gas from the waste gate 13 when the waste gate valve 34 is opened is dispersed, and a concentrated state in which the flow of the exhaust gas from the waste gate 13 when the waste gate valve 34 is opened is concentrated. In the concentrated state, as illustrated in FIG. 24, the angle of the airflow control plate 36a is adjusted by the actuator 37 such that the upstream opening area of the airflow control tube 36 becomes wide and the downstream opening area of the airflow control tube 36 becomes narrow. In the dispersed state, as illustrated in FIG. 25, the angle of the airflow control plate 36a is adjusted by the actuator 37 such that the upstream opening area of the airflow control tube 36 becomes narrow and the downstream opening area of the airflow control tube 36 becomes wide.

The operation and effects of Embodiment 3 will be described.

At the time of the cold start, the waste gate valve 34 is opened, and the form of the airflow control tube 36 is switched to the concentrated state illustrated in FIG. 24. As the angle of the airflow control plate 36a is adjusted such that the upstream opening area of the airflow control tube 36 becomes wide and the downstream opening area of the airflow control tube 36 becomes narrow, the exhaust gas that has flowed out from the waste gate 13 is throttled and concentrated when passing through the airflow control tube 36, and is directed to the center of the upstream end surface of the catalyst 111. As described above, the high-temperature exhaust gas can be concentrated near the center of the catalyst 111 to locally perform the early warming-up, and the catalyst 111 can be activated in a short time after the start to obtain the purification performance.

At the time of the high load, in a case where the turbocharging pressure exceeds the allowable range, the waste gate valve 34 is opened, and the form of the airflow control tube 36 is switched to the dispersed state illustrated in FIG. 25. As the angle of the airflow control plate 36a is adjusted such that the upstream opening area of the airflow control tube 36 becomes narrow and the downstream opening area of the airflow control tube 36 becomes wide, the exhaust gas that has flowed out from the waste gate 13 is dispersed in a circumferential direction when passing through the airflow control tube 36. As described above, the concentration of the high-temperature exhaust gas to the center of the catalyst 111 is suppressed, and the deterioration or damage of the catalyst 111 caused by the local excessive temperature rise can be prevented.

Figure 26:
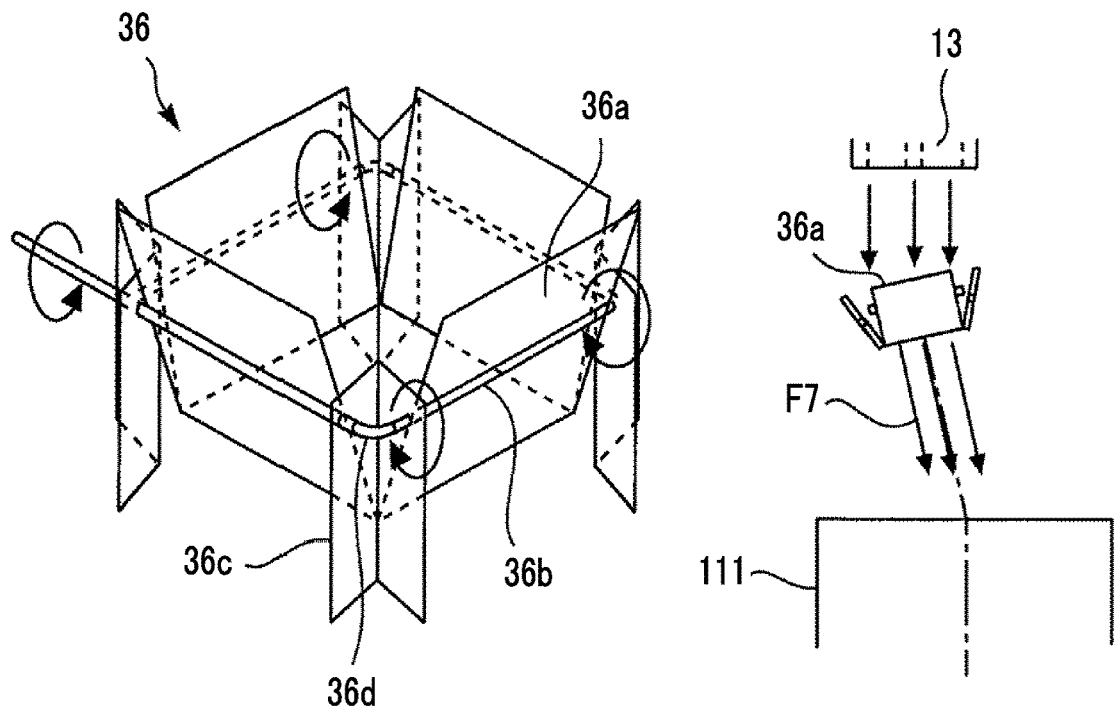
FIG. 26 is a perspective view in a concentrated state of an airflow control tube of Embodiment 3 of the present disclosure.
Figure 27:
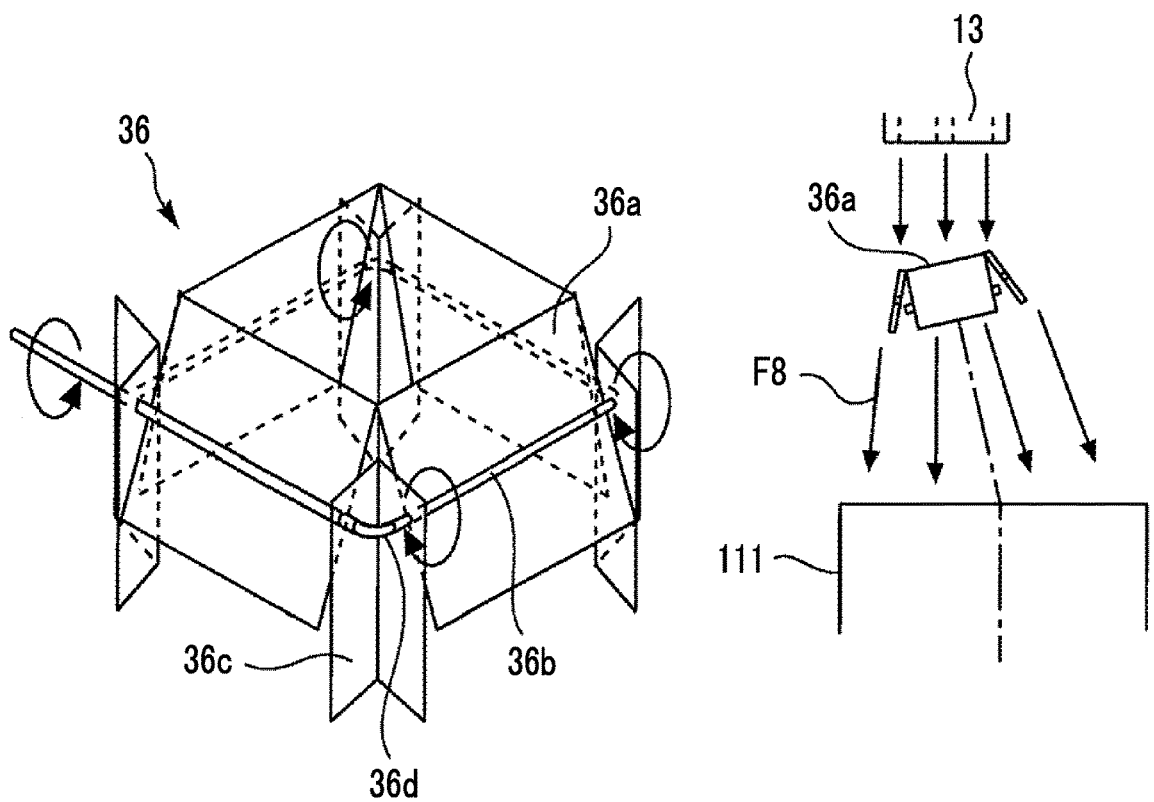
FIG. 27 is a perspective view in a dispersed state of the airflow control tube of Embodiment 3 of the present disclosure.

Here, the airflow control tube 36 will be described in detail. FIG. 26 is a perspective view of the airflow control tube 36 in the concentrated state. FIG. 27 is a perspective view of the airflow control tube 36 in the dispersed state. The airflow control tube 36 includes four airflow control plates 36a, rotary shafts 36b fixed to the airflow control plates 36a, respectively, universal joints 36d that couple two rotary shafts 36b together, and stays 36c that hold the rotary shafts 36b. By rotating a leading rotary shaft 36b of the four rotary shafts 36b coupled by the universal joints 36d, the angles of the four airflow control plates 36a can be collectively changed. Although a case where the four airflow control plates are provided is illustrated in the drawings, an airflow of an entire periphery of 360 degrees in the gas flow direction can be controlled as long as three or more airflow control plates are provided. It is desirable that the airflow control tube 36 is installed such that the exhaust flow F7 of the waste gate in the concentrated state is directed to the center of the end surface of the catalyst 111.

Figure 28:
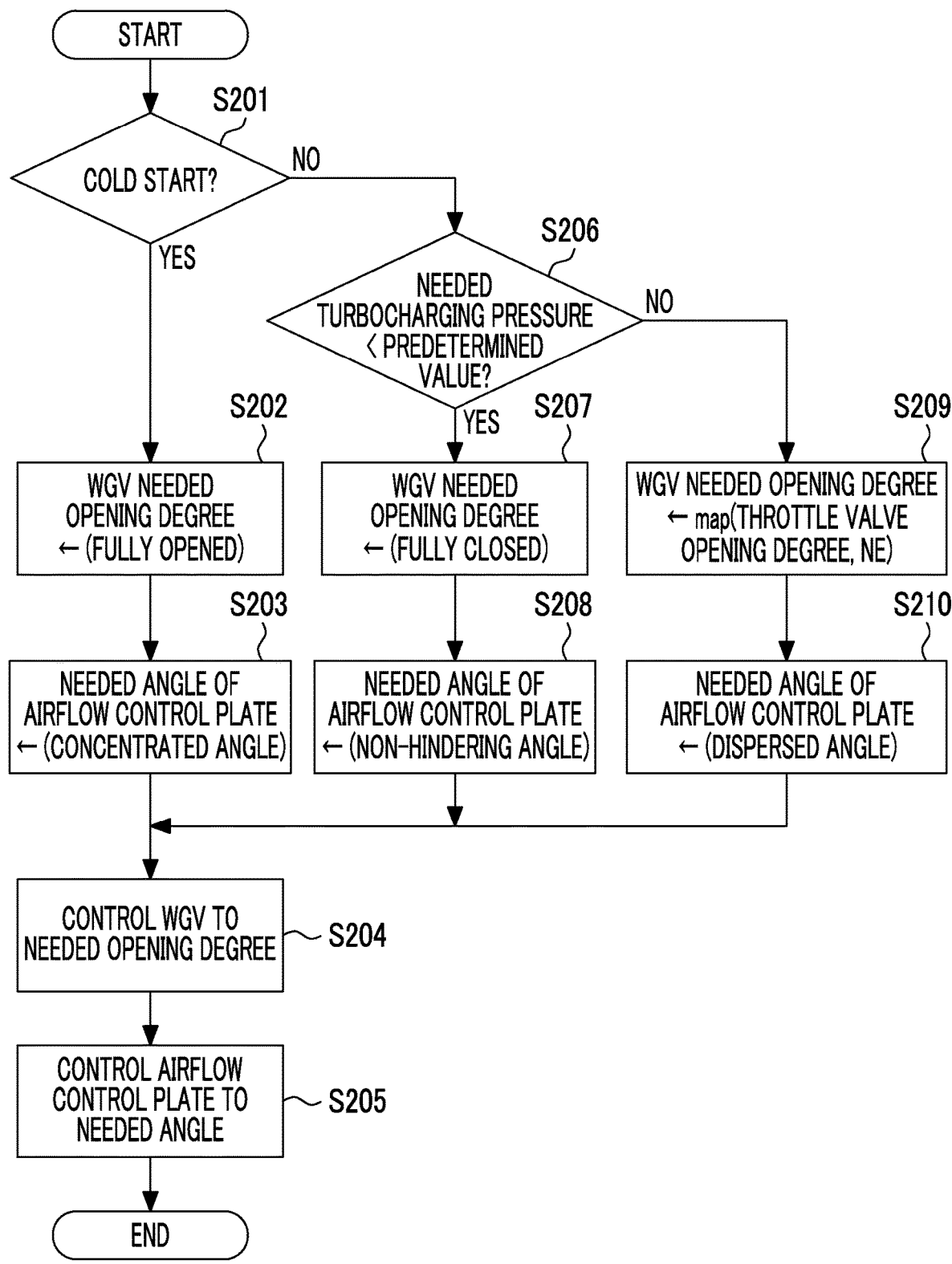
FIG. 28 is a flowchart illustrating a control flow of the waste gate valve and the flow-adjusting mechanism of Embodiment 3 of the present disclosure.

The control of the flow-adjusting mechanism, specifically, the control of the angle of the airflow control plates 36a that constitute the airflow control tube 36 is performed by the ECU 17. By executing one of the programs stored in the memory by the processor, a control flow of the waste gate valve and the flow-adjusting mechanism illustrated by the flowchart in FIG. 28 is executed. The ECU 17 repeatedly executes the processing shown in the control flow in a certain cycle.

According to the control flow, first, whether or not the current time is a cold start time is determined in Step S201. Whether or not the current time is the cold start time is determined from, for example, the coolant temperature of the internal combustion engine. In a case where the current time is the cold start time, in Step S202, a fully opened opening degree is set as a needed opening degree (written as a "WGV needed opening degree" in the flowchart) of the waste gate valve 34. In Step S203, the angle in the concentrated state is set as the needed angle of each airflow control plate 36a.

In a case where the current time is not the cold start time, whether or not a currently needed turbocharging pressure is smaller than a predetermined value is determined in Step S206. The predetermined value referred to in Step S206 is an upper limit value of an allowable range of the turbocharging pressure at the time of the high load. In a case where the needed turbocharging pressure is smaller than the predetermined value that is the upper limit value, in Step S207, a fully closed opening degree is set as the needed opening degree of the waste gate valve 34. In Step S208, an angle at which the opening/closing operation of the waste gate valve 34 is not hindered is set as the needed angle of the airflow control plate 36a.

In a case where the needed turbocharging pressure is equal to or more than the predetermined value that is the upper limit value, in Step S209, an opening degree depending on a load is set as the needed opening degree of the waste gate valve 34. The opening degree depending on a load is acquired from a map in which a throttle valve opening degree and an engine speed (NE) are used as parameters. However, in order to obtain the effect of dispersing the exhaust flow of the waste gate by the airflow control tube 36, the waste gate valve 34 needs to be fully opened or be opened to an angle close to a fully opened state such that the waste gate valve 34 does not interfere with the exhaust flow of the waste gate. In Step S210, the angle in the dispersed state is set as the needed angle of each airflow control plate 36a.

When the needed opening degree of the waste gate valve 34 is set in Step S202, S207, or S209, the operation of the actuator 16 is controlled such that the opening degree of the waste gate valve 34 becomes the needed opening degree in Step S204. When the needed angle of the airflow control plate 36a is set in Step S203, S208, or S210, the operation of the actuator 37 is controlled such that angle of the airflow control plate 36a becomes the needed angle in Step S205.

Embodiment 4

Figure 29:
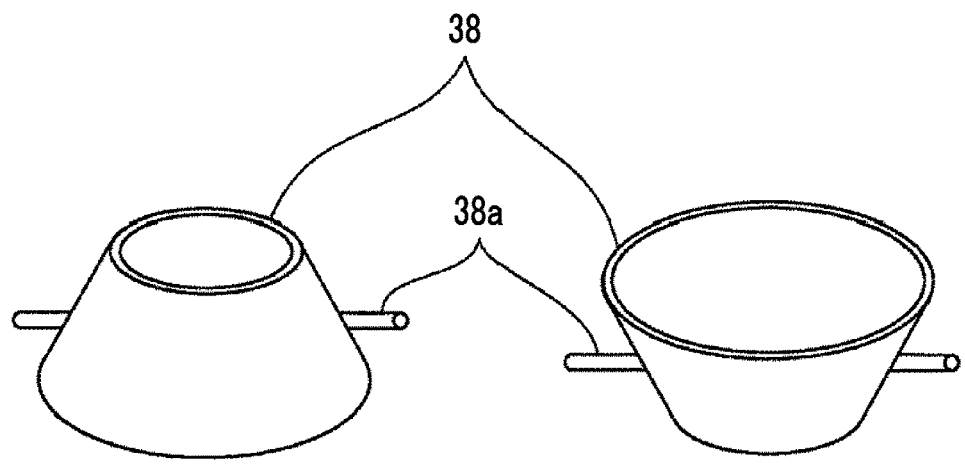
FIG. 29 is a perspective view of an airflow control tube of Embodiment 4 of the present disclosure.

Embodiment 4 of the present disclosure will be described. Embodiment 4 is an embodiment in which the flow-adjusting mechanism of Embodiment 3 has a simpler structure. FIG. 29 is a perspective view of an airflow control tube 38 of Embodiment 4. The airflow control tube 38 of Embodiment 4 is an airflow control tube having a truncated cone shape of which both ends are open. The airflow control tube 38 is provided with a rotary shaft 38a. By rotating the rotary shaft 38a, the upper and lower sides of the airflow control tube 38 can be reversed.

Figure 30:
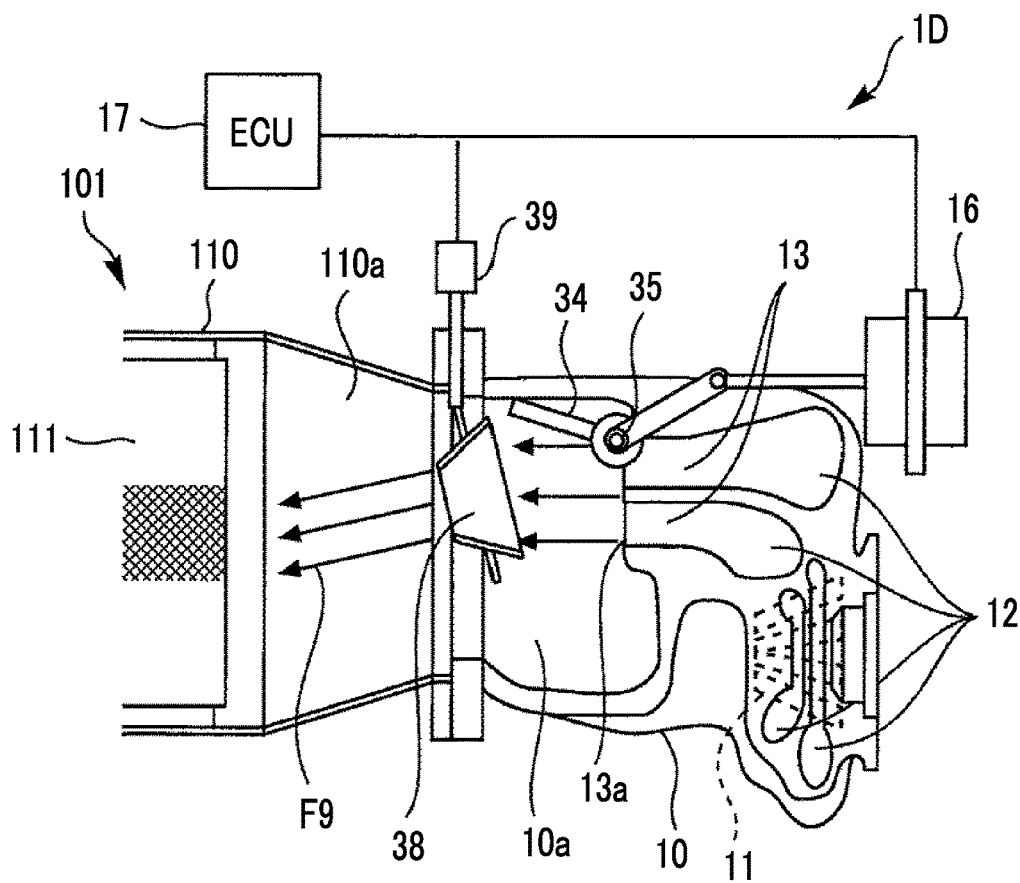
FIG. 30 is a longitudinal sectional view illustrating a configuration in a concentrated state of a flow-adjusting mechanism of Embodiment 4 of the present disclosure and an exhaust flow of a waste gate according to the concentrated state.
Figure 31:
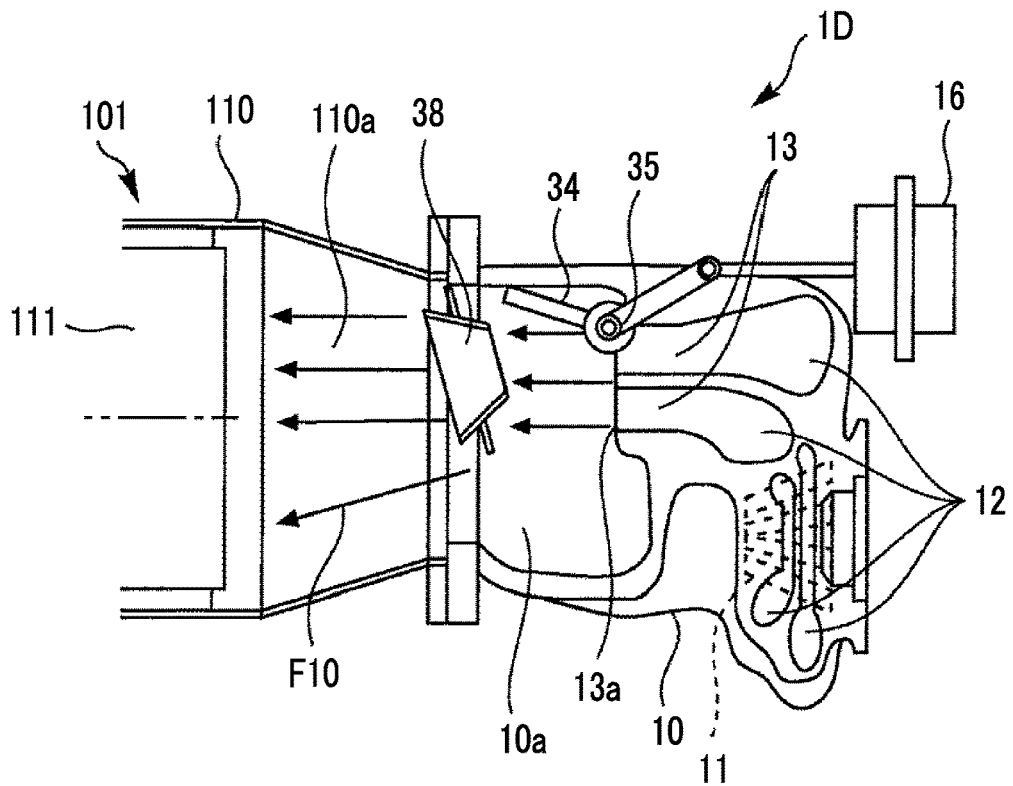
FIG. 31 is a longitudinal sectional view illustrating a configuration in a dispersed state of the flow-adjusting mechanism of Embodiment 4 of the present disclosure and an exhaust flow of the waste gate according to the dispersed state.

FIG. 30 is a longitudinal sectional view illustrating a configuration in a concentrated state of a flow-adjusting mechanism in the internal combustion engine with a turbocharger of Embodiment 4 and an exhaust flow F9 of the waste gate according to the concentrated state. FIG. 31 is a longitudinal sectional view illustrating a configuration in a dispersed state of a flow-adjusting mechanism in the internal combustion engine with a turbocharger of Embodiment 4 and an exhaust flow F10 of the waste gate according to the dispersed state. Hereinafter, the structure of Embodiment 4 will be described with reference to the above-described drawings. In the respective drawings, the elements that are common to those of Embodiments 1 to 3 will be designated with the same reference signs.

A turbine 1D of Embodiment 4 includes the airflow control tube 38 as the flow-adjusting mechanism. The airflow control tube 38 is provided downstream of the outlet 13a of the waste gate 13. The flow-adjusting mechanism includes the airflow control tube 38, and an actuator 39 that rotates the airflow control tube 38 to change the posture of the airflow control tube 38. The airflow control tube 38 is disposed out of a rotational range of the waste gate valve 34 so as not to interfere with the waste gate valve 34. The operation of the actuator 39 is controlled by the ECU 17.

By changing the posture of the airflow control tube 38 by the actuator 39, the form of the airflow control tube 38 is switched. The form of the airflow control tube 38 includes a dispersed state in which the flow of the exhaust gas from the waste gate 13 when the waste gate valve 34 is opened is dispersed, and a concentrated state in which the flow of the exhaust gas from the waste gate 13 when the waste gate valve 34 is opened is concentrated. In the concentrated state, as illustrated in FIG. 30, the posture of the airflow control tube 38 is adjusted by the actuator 39 such that the upstream opening area of the airflow control tube 38 becomes wide and the downstream opening area of the airflow control tube 38 becomes narrow. In the dispersed state, as illustrated in FIG. 31, the posture of the airflow control tube 38 is adjusted by the actuator 39 such that the upstream opening area of the airflow control tube 38 becomes narrow and the downstream opening area of the airflow control tube 38 becomes wide.

The operation and effects of Embodiment 4 will be described.

At the time of the cold start, the waste gate valve 34 is opened, and the posture of the airflow control tube 38 is switched to the concentrated state illustrated in FIG. 30. As the posture of the airflow control tube 38 is adjusted such that the upstream opening area of the airflow control tube 38 becomes wide and the downstream opening area of the airflow control tube 38 becomes narrow, the exhaust gas that has flowed out from the waste gate 13 is throttled and concentrated when passing through the airflow control tube 38, and is directed to the center of the upstream end surface of the catalyst 111. As described above, the high-temperature exhaust gas can be concentrated near the center of the catalyst 111 to locally perform the early warming-up, and the catalyst 111 can be activated in a short time after the start to obtain the purification performance.

At the time of the high load, in a case where the turbocharging pressure exceeds the allowable range, the waste gate valve 34 is opened, and the posture of the airflow control tube 38 is switched to the dispersed state illustrated in FIG. 31. As the posture of the airflow control tube 38 is adjusted such that the upstream opening area of the airflow control tube 38 becomes narrow and the downstream opening area of the airflow control tube 38 becomes wide, the exhaust gas that has flowed out from the waste gate 13 is dispersed in a circumferential direction when passing through the airflow control tube 38. As described above, the concentration of the high-temperature exhaust gas to the center of the catalyst 111 is suppressed, and the deterioration or damage of the catalyst 111 caused by the local excessive temperature rise can be prevented.

Embodiment 5

Figure 32:
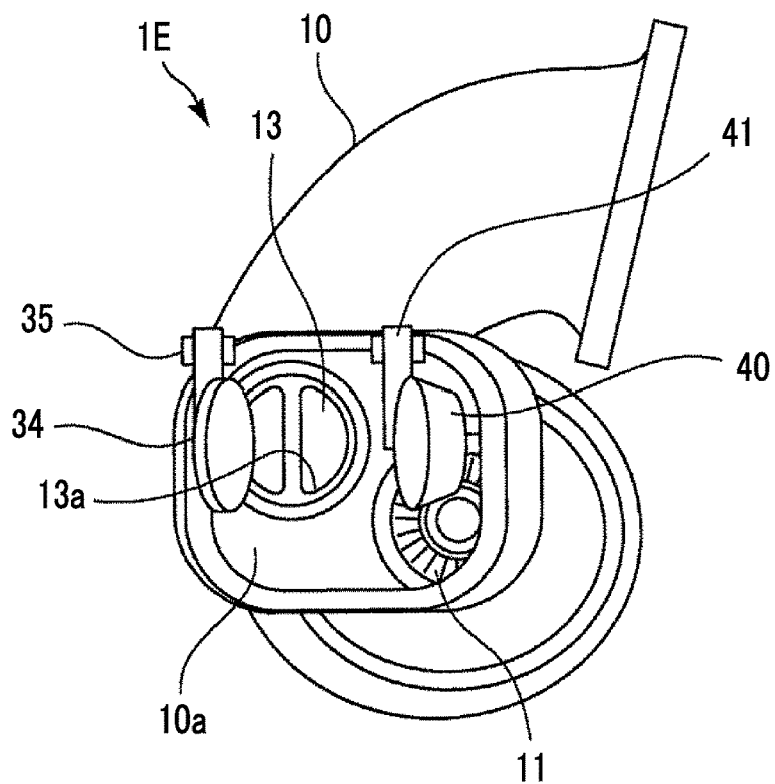
FIG. 32 is a view of a turbine of Embodiment 5 of the present disclosure as viewed from the discharge port side.
Figure 33:
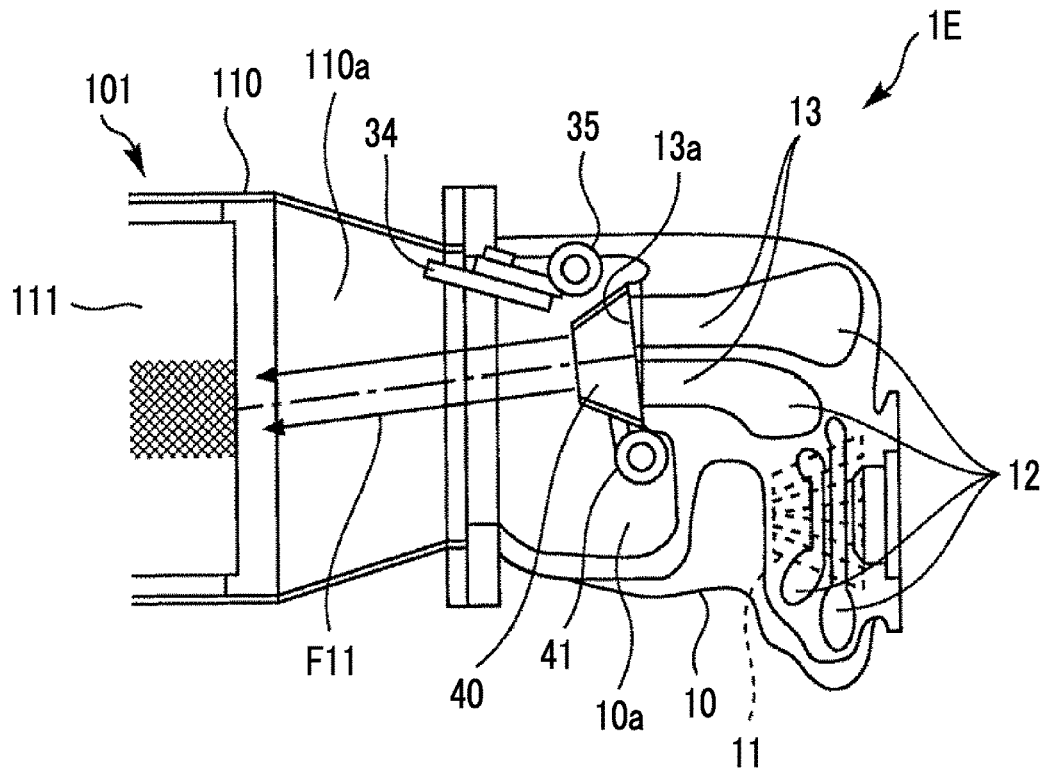
FIG. 33 is a longitudinal sectional view illustrating a configuration in a concentrated state of a flow-adjusting mechanism of Embodiment 5 of the present disclosure and an exhaust flow of a waste gate according to the concentrated state.

Embodiment 5 of the present disclosure will be described. Embodiment 5 is an embodiment that is suitable for being used for a turbine in which the flow of the exhaust gas from the waste gate tends to be dispersed. FIG. 32 is a view of a turbine 1E in the internal combustion engine with a turbocharger of Embodiment 5 as viewed from the discharge port side. FIG. 33 is a longitudinal sectional view illustrating a configuration in a concentrated state of a flow-adjusting mechanism in the internal combustion engine with a turbocharger of Embodiment 5 and an exhaust flow F11 of the waste gate according to the concentrated state. Hereinafter, the structure of Embodiment 5 will be described with reference to the above-described drawings. In the respective drawings, the elements that are common to those of Embodiments 1 to 4 will be designated by the same reference signs.

The turbine 1E of Embodiment 5 includes a truncated cone-shaped airflow control tube 40 of which both ends are open, as the flow-adjusting mechanism. The airflow control tube 40 is capable of rotating about a rotary shaft 41 provided near the outlet 13a of the waste gate 13, and is capable of selecting a state where the airflow control tube 40 is mounted on the outlet 13a of the waste gate 13 as illustrated in FIG. 33 and a state where the airflow control tube 40 is removed from the outlet 13a of the waste gate 13 as illustrated in FIG. 32. The airflow control tube 40 has a truncated cone shape of which the opening area on a side (upstream side) where the airflow control tube 40 is mounted on the outlet 13a of the waste gate 13 is wide and the opening area on a side (downstream side) opposite to the upstream side is narrow. The rotary shaft 41 of the airflow control tube 40 is provided parallel to the rotary shaft 35 of the waste gate valve 34, and is provided on the opposite side of the outlet 13a of the waste gate 13 from the rotary shaft 35 of the waste gate valve 34.

The operation and effects of Embodiment 5 will be described.

At the time of the cold start, as illustrated in FIG. 33, the waste gate valve 34 is opened, and the airflow control tube 40 is mounted on the outlet 13a of the waste gate 13. The position and posture of the airflow control tube 40 in this case are a concentrated state of the airflow control tube 40. Since the upstream opening area of the airflow control tube 40 is wide and the downstream opening area of the airflow control tube 40 is narrow, the exhaust flow F11 of the waste gate is throttled and concentrated when passing through the airflow control tube 40, and is directed to the center of the upstream end surface of the catalyst 111. As described above, the high-temperature exhaust gas can be concentrated near the center of the catalyst 111 to locally perform the early warming-up, and the catalyst 111 can be activated in a short time after the start to obtain the purification performance.

Figure 34:
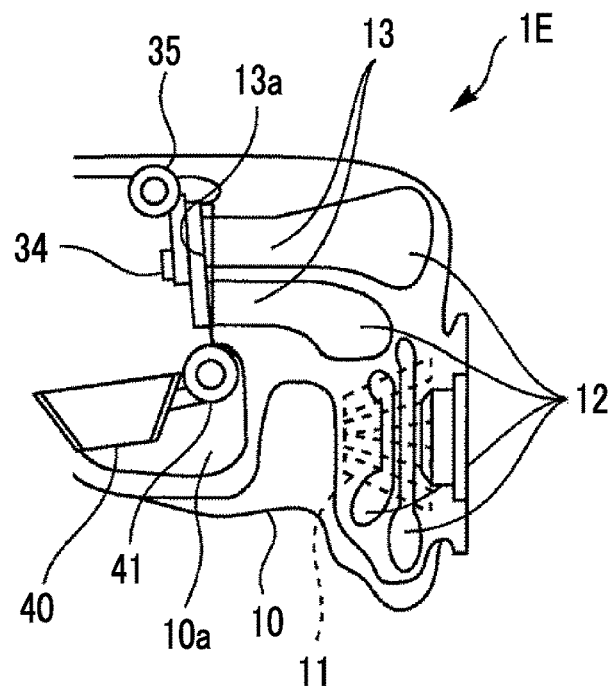
FIG. 34 is a longitudinal sectional view illustrating a configuration of a waste gate valve of Embodiment 5 of the present disclosure when fully closed.

Except for the cold start time, in a case where the load is small and the turbocharging pressure falls within the allowable range, as illustrated in FIG. 34, the airflow control tube 40 is removed from the outlet 13a of the waste gate 13 and the waste gate valve 34 is fully closed. In this case, exhaust gas does not pass through the waste gate 13, passes through the turbine wheel 11 from the scroll 12, and reaches the outlet part 10a of the turbine housing 10 (the exhaust flow of the turbine is not illustrated). The exhaust gas that has passed through the turbine wheel 11 is swirled and dispersed and uniformly passes through the catalyst 111.

Figure 35:
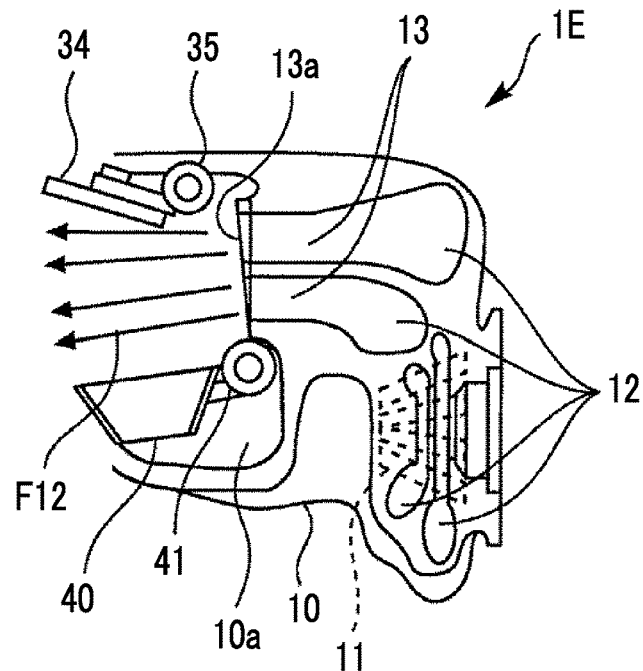
FIG. 35 is a longitudinal sectional view illustrating a configuration in a dispersed state of the flow-adjusting mechanism of Embodiment 5 of the present disclosure and an exhaust flow of the waste gate according to the dispersed state.

At the time of the high load, in a case where the turbocharging pressure exceeds the allowable range, as illustrated in FIG. 35, the waste gate valve 34 is opened, and the airflow control tube 40 is removed from the outlet 13a of the waste gate 13. The position and posture of the airflow control tube 40 in this case are a dispersed state of the airflow control tube 40. In the dispersed state, since there is no flow-adjusting by the airflow control tube 40, the exhaust flow F12 of the waste gate widens at the outlet part 10a of the turbine housing 10, and is dispersed in the circumferential direction. As described above, the concentration of the high-temperature exhaust gas to the center of the catalyst 111 is suppressed, and the deterioration or damage of the catalyst 111 caused by the local excessive temperature rise can be prevented.

Embodiment 6

Figure 36:
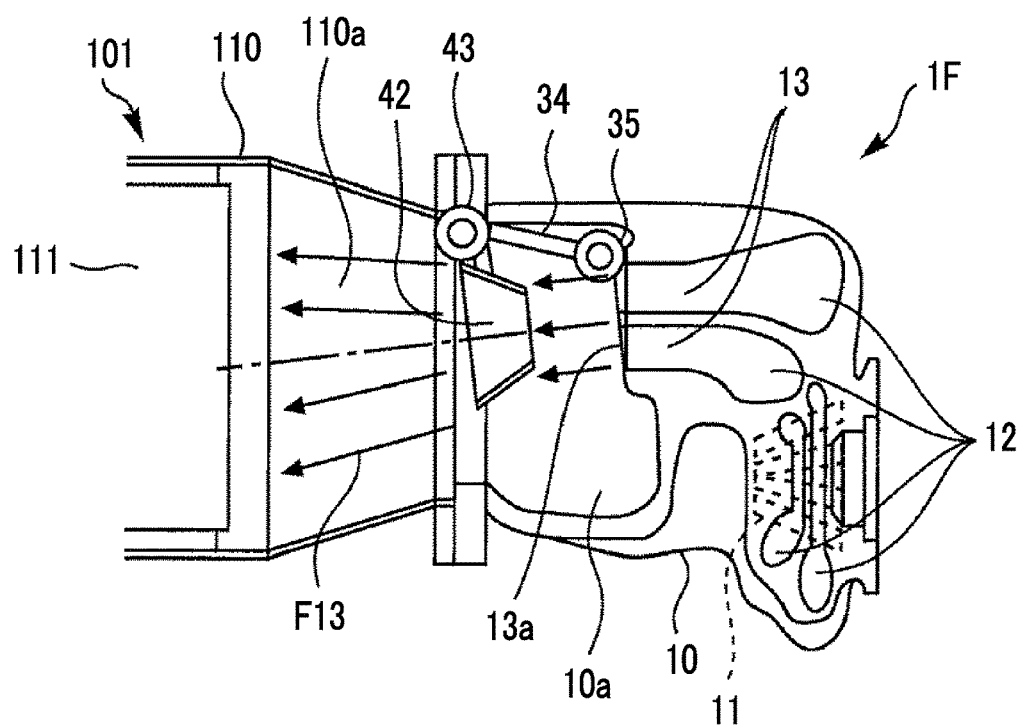
FIG. 36 is a longitudinal sectional view illustrating a configuration in a dispersed state of a flow-adjusting mechanism of Embodiment 6 of the present disclosure and an exhaust flow of a waste gate according to the dispersed state.

Embodiment 6 of the present disclosure will be described. Embodiment 6 is an embodiment that is suitable for being used for a turbine in which the flow of the exhaust gas from the waste gate tends to be concentrated. FIG. 36 is a longitudinal sectional view illustrating a configuration in a dispersed state of a flow-adjusting mechanism in the internal combustion engine with a turbocharger of Embodiment 6 and an exhaust flow F13 of the waste gate according to the dispersed state. Hereinafter, the structure of Embodiment 6 will be described with reference to the above-described drawings. In the respective drawings, the elements that are common to those of Embodiments 1 to 5 will be designated by the same reference signs.

A turbine 1F of Embodiment 6 includes a truncated cone-shaped airflow control tube 42 of which both ends are open, as the flow-adjusting mechanism. The airflow control tube 42 is capable of rotating about a rotary shaft 43 provided downstream of the outlet 13a of the waste gate 13. The airflow control tube 42 is attached to the rotary shaft 43 in a posture in which the upstream opening area of the airflow control tube 42 becomes narrow and the downstream opening area of the airflow control tube 42 becomes wide when being placed in the exhaust flow F13 of the waste gate. The rotary shaft 43 of the airflow control tube 42 is provided parallel to the rotary shaft 35 of the waste gate valve 34, and the airflow control tube 42 is provided so as to be located out of the rotational range of the waste gate valve 34.

The operation and effects of Embodiment 6 will be described.

At the time of the high load, in a case where the turbocharging pressure exceeds the allowable range, as illustrated in FIG. 36, the waste gate valve 34 is opened, and the airflow control tube 42 is placed in the exhaust flow F13 of the waste gate. The position and posture of the airflow control tube 42 in this case are a dispersed state of the airflow control tube 42. Since the upstream opening area of the airflow control tube 42 is narrow and the downstream opening area of the airflow control tube 42 is wide, the exhaust flow F13 of the waste gate is dispersed in the circumferential direction when passing through the airflow control tube 42. As described above, the concentration of the high-temperature exhaust gas to the center of the catalyst 111 is suppressed, and the deterioration or damage of the catalyst 111 caused by the local excessive temperature rise can be prevented.

Figure 37:
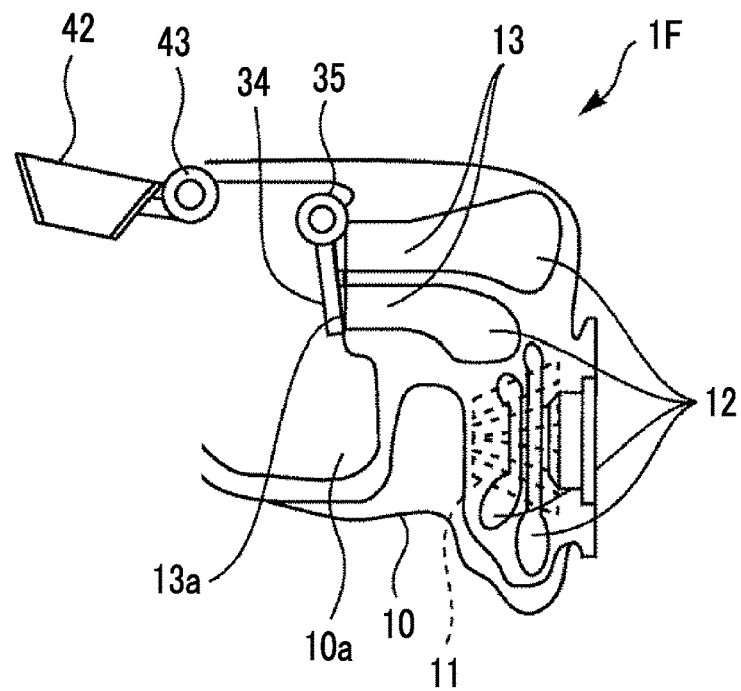
FIG. 37 is a longitudinal sectional view illustrating a configuration of a waste gate valve of Embodiment 6 of the present disclosure when fully closed.

Except for the cold start time, in a case where the load is small and the turbocharging pressure falls within the allowable range, as illustrated in FIG. 37, the airflow control tube 42 is closed and the waste gate valve 34 is fully closed. In this case, exhaust gas does not pass through the waste gate 13, passes through the turbine wheel 11 from the scroll 12, and reaches the outlet part 10a of the turbine housing 10 (the exhaust flow of the turbine is not illustrated). The exhaust gas that has passed through the turbine wheel 11 is swirled and dispersed and uniformly passes through the catalyst 111.

Figure 38:
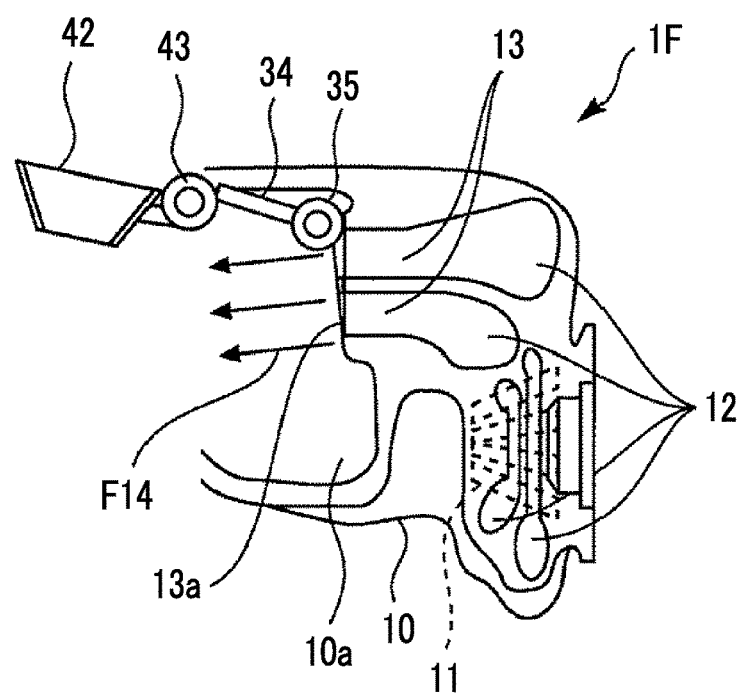
FIG. 38 is a longitudinal sectional view illustrating a configuration in a concentrated state of the flow-adjusting mechanism of Embodiment 6 of the present disclosure and an exhaust flow of the waste gate according to the concentrated state.

At the time of the cold start, as illustrated in FIG. 38, the waste gate valve 34 is opened, and the airflow control tube 42 is placed out of the exhaust flow F14 of the waste gate. The position and posture of the airflow control tube 42 in this case are a concentrated state of the airflow control tube 42. In the concentrated state, since there is no flow-adjusting by the airflow control tube 42, the exhaust flow F14 of the waste gate is directed to the center of the upstream end surface of the catalyst 111, with the concentrated state maintained. As described above, the high-temperature exhaust gas can be concentrated near the center of the catalyst 111 to locally perform the early warming-up, and the catalyst 111 can be activated in a short time after the start to obtain the purification performance.

Other Embodiments

The above-described embodiments exemplify the apparatus and method for embodying the technical idea of the present disclosure, and there is no intention to limit the structure and arrangement of the components, processing order, and the like except for cases that are expressly stated otherwise. In addition, the present disclosure is not limited to the above-described embodiments, and can be variously modified and embodied without departing from the scope of the present disclosure.

In one embodiment of the first aspect of the present disclosure, a turbine discharge port to which the exhaust gas that has passed through the turbine wheel is discharged and the outlet of the waste gate may be arranged in parallel. The waste gate valve may be a flap-type valve that has a rotary shaft disposed so as to intersect an arrangement direction of the turbine discharge port and the outlet of the waste gate at an acute angle and that opens and closes the waste gate by rotating about the rotary shaft. The flow-adjusting member may be a flow-adjusting plate that is provided in a wall shape on a surface at which the outlet of the waste gate is provided. The flow-adjusting plate may be located on the opposite side of the outlet of the waste gate from the rotary shaft. The flow-adjusting plate may have a longer distance from the outlet of the waste gate on a side near the turbine discharge port and have a shorter distance from the outlet of the waste gate on a side far from the turbine discharge port.

In another embodiment of the first aspect of the present disclosure, the waste gate valve may be a slide-type valve that opens and closes the waste gate by sliding in parallel with a surface at which the outlet of the waste gate is provided. The flow-adjusting member may be provided downstream of the outlet of the waste gate across the waste gate valve. The flow-adjusting member may be a funnel-type duct of which a flow passage cross-sectional area decreases from an upstream side to a downstream side.

In another embodiment according to the first aspect of the present disclosure, the waste gate valve may have a first region and a second region by side by side in a sliding direction. The first region may have a plurality of holes. The second region may have no hole. The waste gate may be half opened by a lid of the waste gate being placed in the first region, and the waste gate may be fully closed by the lid of the waste gate being placed in the second region.

In still another embodiment of the first aspect of the present disclosure, the waste gate may have a partition wall that bisects the outlet and extends in the sliding direction of the waste gate valve. An engagement part that is slidable in the sliding direction may be provided between the partition wall and a back surface of the waste gate valve.

In one embodiment of a second aspect of the present disclosure, the flow-adjusting mechanism may include an airflow control tube and an actuator. The airflow control tube may be provided downstream of the outlet of the waste gate. The airflow control tube may include three or more airflow control plates and may have a tubular shape. The actuator may be configured to change an angle of each of the airflow control plates. In the dispersed state, the angle of the airflow control plate may be adjusted by the actuator such that an upstream opening area of the airflow control tube becomes narrow and a downstream opening area of the airflow control tube becomes wide. In the concentrated state, the angle of the airflow control plate may be adjusted by the actuator such that the upstream opening area of the airflow control tube becomes wide and the downstream opening area of the airflow control tube becomes narrow.

In another embodiment of the second aspect of the present disclosure, the flow-adjusting mechanism may include an airflow control tube and an actuator. The airflow control tube may be provided downstream of the outlet of the waste gate. The airflow control tube may have a truncated cone-shape. The actuator may be configured to change a posture of the airflow control tube. In the dispersed state, the posture of the airflow control tube may be adjusted by the actuator such that an upstream opening area of the airflow control tube becomes narrow and a downstream opening area of the airflow control tube becomes wide. In the concentrated state, the posture of the airflow control tube may be adjusted by the actuator such that the upstream opening area of the airflow control tube becomes wide and the downstream opening area of the airflow control tube becomes narrow.

In another embodiment of the second aspect of the present disclosure, the flow-adjusting mechanism may include an airflow control tube that is detachably provided with respect to the outlet of the waste gate. The airflow control tube may have a truncated cone-shape of which the upstream opening area of the airflow control tube is wide and the downstream opening area of the airflow control tube is narrow. In the dispersed state, the airflow control tube may be removed from the outlet of the waste gate. In the concentrated state, the airflow control tube may be mounted on the outlet of the waste gate.

In still another embodiment of the second aspect of the present disclosure, the flow-adjusting mechanism may include an airflow control tube that is provided downstream of the outlet of the waste gate. The airflow control tube may be provided downstream of the outlet of the waste gate. The airflow control tube may have a truncated cone-shape of which the upstream opening area of the airflow control tube is narrow and the downstream opening area of the airflow control tube is wide. In the dispersed state, the airflow control tube may be placed in the flow of the exhaust gas from the waste gate. In the concentrated state, the airflow control tube may be placed out of the flow of the exhaust gas from the waste gate.

What is claimed is:

1. An internal combustion engine with a turbocharger including a catalyst, downstream of a turbine of the turbocharger, in an exhaust passage, the internal combustion engine comprising:
   a waste gate that bypasses a turbine wheel of the turbine;
   a waste gate valve provided at an outlet of the waste gate, the waste gate valve configured to open and close the waste gate, and the waste gate valve being configured to change an opening degree thereof in multiple steps; and
   a plate configured to disperse a flow of exhaust gas from the waste gate when the opening degree of the waste gate valve is relatively small and concentrate the flow of the exhaust gas from the waste gate when the opening degree of the waste gate valve is relatively large, wherein
   a distance from a first inner peripheral surface of the plate to the outlet of the waste gate is longer than a distance from a second inner peripheral surface of the plate to the outlet of the waste gate, the first inner peripheral surface of the plate being closer to the turbine discharge port than the second inner peripheral surface of the plate.

2. The internal combustion engine according to claim 1, wherein
   a turbine discharge port, to which exhaust gas that has passed through the turbine wheel is discharged, and the outlet of the waste gate are arranged in parallel;
   the waste gate valve is a flap-type valve that has a rotary shaft disposed so as to intersect an arrangement direction of the turbine discharge port and the outlet of the waste gate at an acute angle and that is configured to open and close the waste gate by rotating about the rotary shaft,
   the plate is wall-shaped and provided on a surface at which the outlet of the waste gate is provided, and the plate is located on an opposite side of the outlet of the waste gate from the rotary shaft.

* * * * *